(12) United States Patent  
Gao et al.

(10) Patent No.: US 12,517,243 B2  
(45) Date of Patent: Jan. 6, 2026

(54) INFORMATION REPORTING METHOD, INFORMATION RECEIVING METHOD, AND APPARATUS

(71) Applicant: Shenzhen Yinwang Intelligent Technologies Co., Ltd., Shenzhen (CN)

(72) Inventors: Lutao Gao, Beijing (CN); Sha Ma, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 499 days.

(21) Appl. No.: 17/698,233

(22) Filed: Mar. 18, 2022

(65) Prior Publication Data

US 2022/0204004 A1     Jun. 30, 2022

Related U.S. Application Data

(63) Continuation of application No. PCT/CN2020/114887, filed on Sep. 11, 2020.

(30) Foreign Application Priority Data

Sep. 20, 2019 (CN) .................. 201910891268.1

(51) Int. Cl.  
    *G01S 13/931*      (2020.01)  
    *B60W 50/02*      (2012.01)  
    *G01S 7/02*       (2006.01)

(52) U.S. Cl.  
    CPC ....... *G01S 13/931* (2013.01); *B60W 50/0205* (2013.01); *B60W 2420/408* (2024.01); *B60W 2420/54* (2013.01); *G01S 7/0236* (2021.05)

(58) Field of Classification Search  
None  
See application file for complete search history.

(56) References Cited

U.S. PATENT DOCUMENTS

| | | |
|---|---|---|
| 4,573,052 A | 2/1986 | Guillerot et al. |
| 2016/0320476 A1 | 11/2016 | Johnson |
| 2017/0160392 A1 | 6/2017 | Brisimitzakis et al. |
| 2018/0203095 A1* | 7/2018 | Xie .......................... G01S 7/023 |
| 2019/0113600 A1* | 4/2019 | Melzer ................. G01S 13/931 |

FOREIGN PATENT DOCUMENTS

| | | |
|---|---|---|
| CN | 105891799 A | 8/2016 |
| CN | 108627807 A | 10/2018 |
| CN | 109143221 A | 1/2019 |
| CN | 109613508 A | 4/2019 |
| CN | 109738872 A | 5/2019 |

* cited by examiner

*Primary Examiner* — Raymond L Nimox  
(74) *Attorney, Agent, or Firm* — Leydig, Voit & Mayer, Ltd.

(57) ABSTRACT

An information reporting method and apparatus for of automatic or intelligent driving, the method including receiving, by a detection apparatus, a first signal, determining, by the detection apparatus, based on the first signal, an interfered range in a detection range of the detection apparatus, and sending, by the detection apparatus, interference information to a fusion apparatus, where the interference information comprises indication information of the interfered range.

20 Claims, 18 Drawing Sheets

INFORMATION REPORTING METHOD, INFORMATION RECEIVING METHOD, AND APPARATUS

CROSS-REFERENCE TO RELATED APPLICATIONS

This application is a continuation of International Application No. PCT/CN2020/114887, filed on Sep. 11, 2020, which claims priority to Chinese Patent Application No. 201910891268.1, filed on Sep. 20, 2019. The disclosures of the aforementioned applications are hereby incorporated by reference in their entireties.

TECHNICAL FIELD

Embodiments of this application relate to the field of automatic driving technologies, and in particular, to an information reporting method, an information receiving method, and an apparatus.

BACKGROUND

With development of society, intelligent vehicles are gradually entering people's daily life. A sensor plays a very important role in assisted driving and automated driving of the intelligent vehicles. In a driving process of a vehicle, various sensors installed on the vehicle sense a surrounding environment at any time, collect data, identify and track moving objects, identify still scenarios such as a lane line and a signboard, and perform path planning with reference to a navigator and map data. The sensors can detect a potential danger in advance, and help a driver even autonomously take a necessary avoidance means in time, so that vehicle driving safety and comfort are effectively improved.

In the field of automatic driving, sensors may include detection apparatuses such as a millimeter-wave radar, a laser radar, a camera, and an ultrasonic radar. In a conventional technology, to improve accuracy of a fusion result, in addition to sending a target detection result to a fusion apparatus, the detection apparatus further sends indication information such as whether the detection apparatus is currently interfered with and interference intensity to the fusion apparatus. Correspondingly, the fusion apparatus determines confidence of the target detection result according to the indication information sent by the detection apparatus. For example, if the detection apparatus is interfered with, the fusion apparatus reduces the confidence of the target detection result. If the detection apparatus is not interfered with, the fusion apparatus increases the confidence of the target detection result and the like. Researchers find that whether the target detection result is accurate is also related to an impact range of interference. How the detection apparatus reports the impact range of interference becomes a current research hotspot.

SUMMARY

Embodiments of this application provide an information reporting method, an information receiving method, and an apparatus, so that a detection apparatus can report an impact range of interference.

According to a first aspect, an information reporting method is provided, and includes: A detection apparatus receives a first signal, the detection apparatus determines an interfered range in a detection range of the detection apparatus based on the first signal, and the detection apparatus sends interference information to a fusion apparatus, where the interference information includes indication information of the interfered range.

In the foregoing method, the fusion apparatus may determine the interfered range in the detection range of the detection apparatus, determine confidence of a target detection result of the detection apparatus, and increase accuracy of a fusion result.

In a possible design, the indication information of the interfered range is used to indicate at least one of an interfered distance range, an interfered speed range, or an interfered angle range.

In a possible design, the interfered range is determined by at least one of an interfered distance interval, an interfered speed interval, or an interfered angle interval, the interfered distance range is represented by the distance interval, the interfered speed range is represented by the speed interval, and/or the interfered angle range is represented by the angle interval.

In the foregoing method, the interval is used, so that an interfered range in a detection result of the detection apparatus can be more accurately described, and target detection accuracy of the fusion apparatus can be improved.

In a possible design, the interference information includes at least one piece of interference intensity information, and the at least one piece of interference intensity information corresponds to at least one of the interfered distance range, the interfered speed range, or the interfered angle range.

In a possible design, the interfered range is determined by using a matrix represented by at least one of an interfered distance dimension, an interfered speed dimension, or an interfered angle dimension, and an element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

In the foregoing method, the matrix is used, so that an interfered range in a detection result of the detection apparatus can be more accurately described, and target detection accuracy of the fusion apparatus can be improved.

In a possible design, the first range includes a first value and a second value, the first value is greater than the second value, and interference intensity represented by the first value is greater than interference intensity represented by the second value.

In a possible design, the interference information further includes at least one of indication information indicating whether the detection apparatus receives an interference signal or a time range in which the detection apparatus is interfered with.

According to a second aspect, an information receiving method is provided, and includes: A fusion apparatus receives interference information from a detection apparatus, where the interference information includes indication information of an interfered range in a detection range of the detection apparatus, and the fusion apparatus determines the interfered range in the detection range of the detection apparatus based on the interference information.

In a possible design, the indication information of the interfered range is used to indicate at least one of an interfered distance range, an interfered speed range, or an interfered angle range.

In a possible design, that the fusion apparatus determines the interfered range in the detection range of the detection apparatus based on the interference information includes: The fusion apparatus determines the interfered range in the detection range of the detection apparatus based on at least one of an interfered distance interval, an interfered speed interval, or an interfered angle interval, where the interfered distance range is represented by the distance interval, the interfered speed range is represented by the speed interval, and the interfered angle range is represented by the angle interval.

In a possible design, the interference information includes at least one piece of interference intensity information, and the at least one piece of interference intensity information corresponds to at least one of the distance range, the speed range, or the angle range.

In a possible design, that the fusion apparatus determines the interfered range in the detection range of the detection apparatus based on the interference information includes: The fusion apparatus determines the interfered range in the detection range of the detection apparatus based on a matrix represented by at least one of an interfered distance dimension, an interfered speed dimension, or an interfered angle dimension, where an element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

In a possible design, the first range includes a first value and a second value, the first value is greater than the second value, and interference intensity represented by the first value is greater than interference intensity represented by the second value.

In a possible design, the interference information further includes at least one of indication information indicating whether the detection apparatus receives an interference signal or a time range in which the detection apparatus is interfered with.

According to a third aspect, an apparatus is provided, the apparatus may be a detection apparatus, or may be a component such as a chip in the detection apparatus, and the apparatus includes a transceiver module and a processing module.

The transceiver module is configured to receive a first signal.

The processing module is configured to determine an interfered range in a detection range of the detection apparatus based on the first signal.

The transceiver module is further configured to send interference information to a fusion apparatus, where the interference information includes indication information of the interfered range.

In a possible design, the indication information of the interfered range is used to indicate at least one of an interfered distance range, an interfered speed range, or an interfered angle range.

In a possible design, the interfered range is determined by at least one of an interfered distance interval, an interfered speed interval, or an interfered angle interval, the interfered distance range is represented by the distance interval, the interfered speed range is represented by the speed interval, and/or the interfered angle range is represented by the angle interval.

In a possible design, the interference information includes at least one piece of interference intensity information, and the at least one piece of interference intensity information corresponds to at least one of the interfered distance range, the interfered speed range, or the interfered angle range.

In a possible design, the interfered range is determined by using a matrix represented by at least one of an interfered distance dimension, an interfered speed dimension, or an interfered angle dimension, and an element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

In a possible design, the first range includes a first value and a second value, the first value is greater than the second value, and interference intensity represented by the first value is greater than interference intensity represented by the second value.

In a possible design, the interference information further includes at least one of indication information indicating whether the detection apparatus receives an interference signal or a time range in which the detection apparatus is interfered with.

According to a fourth aspect, an apparatus is provided, the apparatus may be a fusion apparatus, or may be a component such as a chip in the fusion apparatus, and the apparatus includes: a transceiver module, configured to receive interference information from a detection apparatus, where the interference information includes indication information of an interfered range in a detection range of the detection apparatus, and a processing module, configured to determine the interfered range in the detection range of the detection apparatus based on the interference information.

In a possible design, the indication information of the interfered range is used to indicate at least one of an interfered distance range, an interfered speed range, or an interfered angle range.

In a possible design, when determining the interfered range in the detection range of the detection apparatus based on the interference information, the processing module is specifically configured to: determine the interfered range in the detection range of the detection apparatus based on at least one of an interfered distance interval, an interfered speed interval, or an interfered angle interval, where the interfered distance range is represented by the distance interval, the interfered speed range is represented by the speed interval, and the interfered angle range is represented by the angle interval.

In a possible design, the interference information includes at least one piece of interference intensity information, and the at least one piece of interference intensity information corresponds to at least one of the distance range, the speed range, or the angle range.

In a possible design, when determining the interfered range in the detection range of the detection apparatus based on the interference information, the processing module is specifically configured to: determine the interfered range in the detection range of the detection apparatus based on a matrix represented by at least one of an interfered distance dimension, an interfered speed dimension, or an interfered angle dimension, where an element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

In a possible design, the first range includes a first value and a second value, the first value is greater than the second value, and interference intensity represented by the first value is greater than interference intensity represented by the second value.

In a possible design, the interference information further includes at least one of indication information indicating whether the detection apparatus receives an interference signal or a time range in which the detection apparatus is interfered with.

According to a fifth aspect, an apparatus is provided, including a processor and a communications interface.

The communications interface is configured to receive a first signal. The processor is configured to determine an interfered range in a detection range of a detection apparatus based on the first signal. The communications interface is further configured to send interference information to a fusion apparatus, where the interference information includes indication information of the interfered range.

In a possible design, the indication information of the interfered range is used to indicate at least one of an interfered distance range, an interfered speed range, or an interfered angle range.

In a possible design, the interfered range is determined by at least one of an interfered distance interval, an interfered speed interval, or an interfered angle interval, the interfered distance range is represented by the distance interval, the interfered speed range is represented by the speed interval, and/or the interfered angle range is represented by the angle interval.

In a possible design, the interference information includes at least one piece of interference intensity information, and the at least one piece of interference intensity information corresponds to at least one of the interfered distance range, the interfered speed range, or the interfered angle range.

In a possible design, the interfered range is determined by using a matrix represented by at least one of an interfered distance dimension, an interfered speed dimension, or an interfered angle dimension, and an element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

In a possible design, the first range includes a first value and a second value, the first value is greater than the second value, and interference intensity represented by the first value is greater than interference intensity represented by the second value.

In a possible design, the interference information further includes at least one of indication information indicating whether the detection apparatus receives an interference signal or a time range in which the detection apparatus is interfered with.

According to a sixth aspect, an apparatus is provided, including a processor and a communications interface.

The communications interface is configured to receive interference information from a detection apparatus, where the interference information includes indication information of an interfered range in a detection range of the detection apparatus. The processor is configured to determine the interfered range in the detection range of the detection apparatus based on the interference information.

In a possible design, the indication information of the interfered range is used to indicate at least one of an interfered distance range, an interfered speed range, or an interfered angle range.

In a possible design, when determining the interfered range in the detection range of the detection apparatus based on the interference information, the processor is specifically configured to: determine the interfered range in the detection range of the detection apparatus based on at least one of an interfered distance interval, an interfered speed interval, or an interfered angle interval, where the interfered distance range is represented by the distance interval, the interfered speed range is represented by the speed interval, and the interfered angle range is represented by the angle interval.

In a possible design, the interference information includes at least one piece of interference intensity information, and the at least one piece of interference intensity information corresponds to at least one of the distance range, the speed range, or the angle range.

In a possible design, when determining the interfered range in the detection range of the detection apparatus based on the interference information, the processor is specifically configured to: determine the interfered range in the detection range of the detection apparatus based on a matrix represented by at least one of an interfered distance dimension, an interfered speed dimension, or an interfered angle dimension, where an element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

In a possible design, the first range includes a first value and a second value, the first value is greater than the second value, and interference intensity represented by the first value is greater than interference intensity represented by the second value.

In a possible design, the interference information further includes at least one of indication information indicating whether the detection apparatus receives an interference signal or a time range in which the detection apparatus is interfered with.

According to a seventh aspect, a computer-readable storage medium is provided, including instructions, and when the instructions are run on a computer, the computer is enabled to perform the method designed in the first aspect or the second aspect.

According to an eighth aspect, a chip system is provided. The chip system includes a processor, and may further include a memory, to implement the method designed in the first aspect or the second aspect. The chip system may include a chip, or may include a chip and another discrete component.

According to a ninth aspect, a computer program product including instructions is provided, and when the instructions are run on a computer, the computer is enabled to perform the method designed in the first aspect or the second aspect.

According to a tenth aspect, a system is provided, including the apparatus according to the third aspect and the apparatus according to the fourth aspect, or the apparatus according to the fifth aspect and the apparatus according to the sixth aspect.

DETAILED DESCRIPTION OF ILLUSTRATIVE EMBODIMENTS

Figure 1:
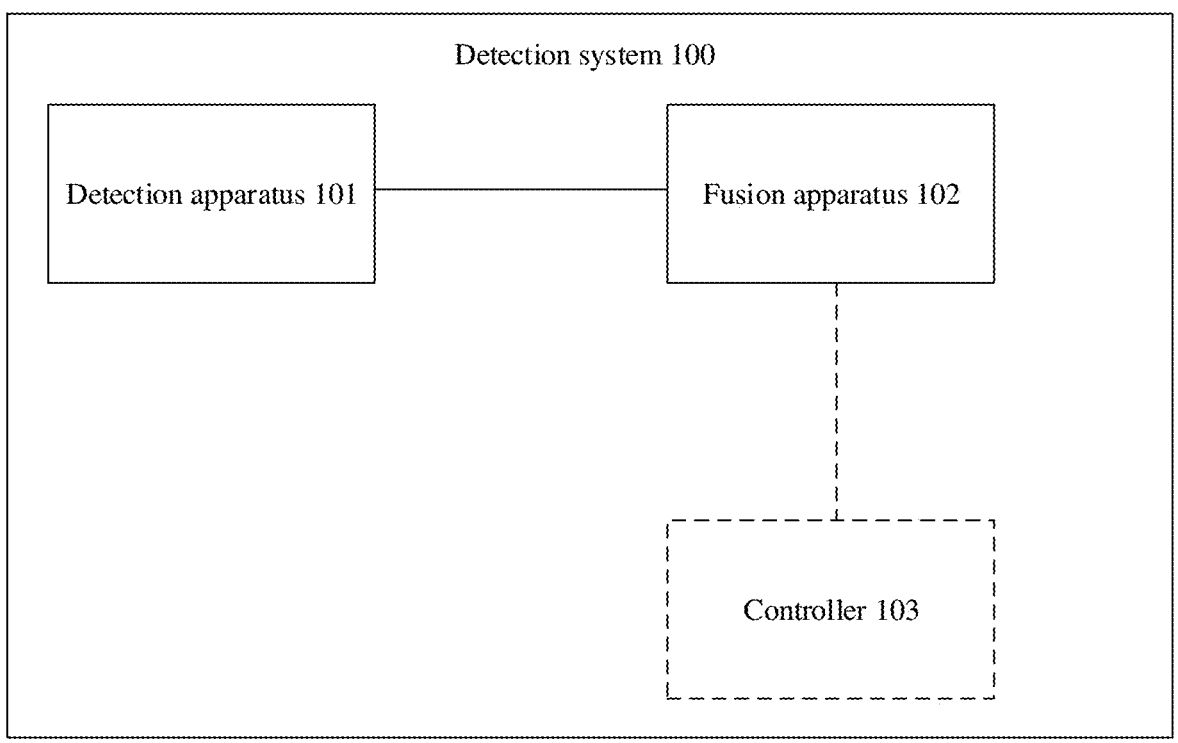
FIG. 1 is a schematic diagram of a system architecture according to an embodiment of this application.

As shown in FIG. 1, a detection system 100 is provided, and the detection system 100 includes a detection apparatus 101 and a fusion apparatus 102. Optionally, the detection system 100 may further include a controller 103, and the fusion apparatus 102 may further be referred to as an electronic control unit (ECU), a domain control unit (DCU), a multi-domain controller (MDC), or the like.

The detection apparatus 101 may be a millimeter-wave radar, a laser radar, an ultrasonic radar, or the like. The detection apparatus 101 may detect a target, generate a first target detection result, and send the first target detection result to the fusion apparatus 102. The fusion apparatus 102 may determine a third target detection result based on the first target detection result and a second target detection result that is sent by another sensor (for example, a camera), and send the third target detection result to the controller 103. The controller 103 controls a vehicle based on the third target detection result. For example, if the third target detection result is that there is an object in front of the vehicle, the controller 103 may decelerate or brake to ensure vehicle safety.

Due to reasons such as relatively low costs and relatively mature technologies, a millimeter-wave radar first becomes a main sensor of an unmanned driving system. In the following descriptions, a working principle of the detection apparatus 101 and various problems of the detection system 100 in the current solution are described in detail by using a millimeter-wave radar, a radar, or a vehicle-mounted radar as an example of the detection apparatus 101.

Figure 2:
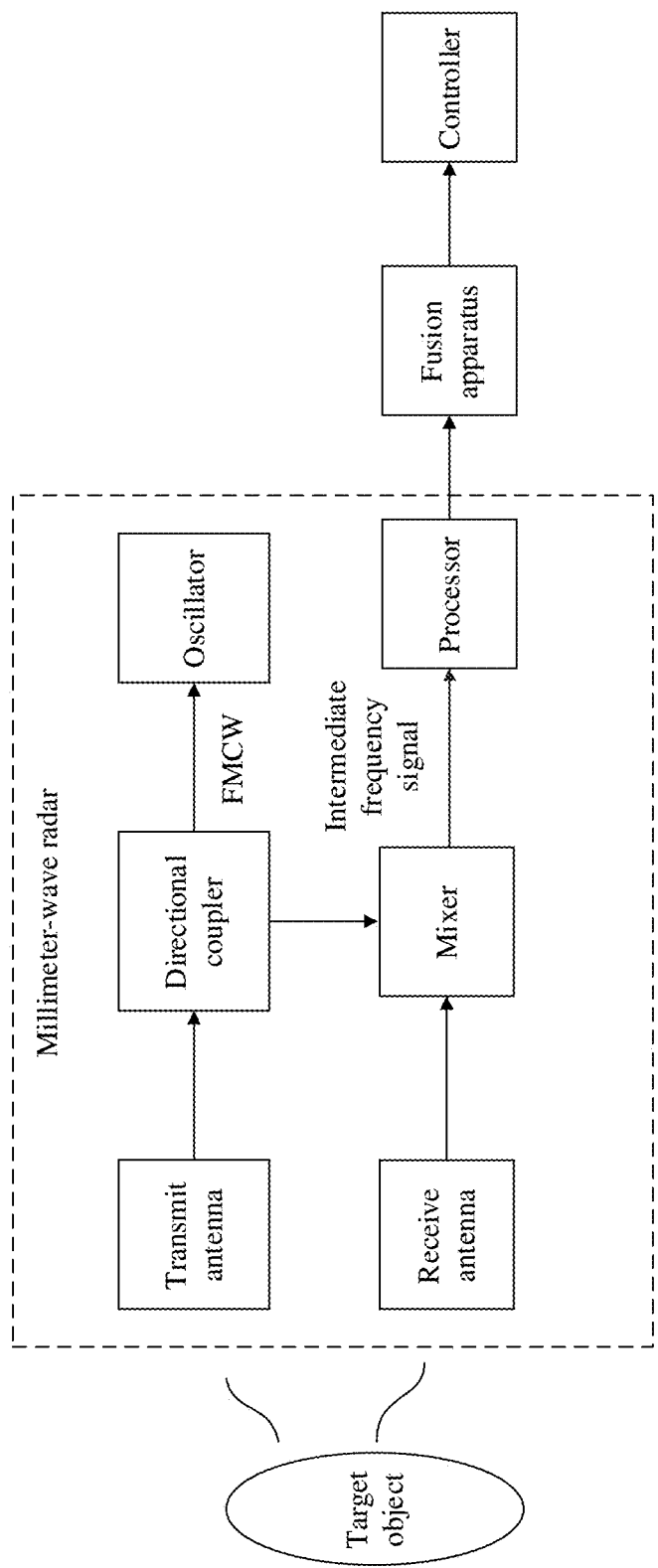
FIG. 2 is a schematic diagram of a structure of a millimeter-wave radar according to an embodiment of this application.

As shown in FIG. 2, a millimeter-wave radar usually includes an oscillator, a directional coupler, a transmit antenna, a receive antenna, a frequency mixer, and a processor. The oscillator generates a frequency-modulated continuous wave (FMCW) whose frequency increases linearly with time. A part of the FMCW is output to the frequency mixer as a local-frequency signal through the directional coupler, and the other part of the FMCW is transmitted through the transmit antenna. The receive antenna receives a millimeter-wave signal reflected from a target object in front of a vehicle, and mixes the millimeter-wave signal with the local-frequency signal in the frequency mixer to obtain an intermediate frequency signal. The intermediate frequency signal may include information such as a distance, a speed, or an angle of the target object relative to the vehicle. The processor processes the intermediate frequency signal, for example, performs fast Fourier transform and spectrum analysis on the intermediate frequency signal to obtain the information such as the distance, the speed, and the angle of the target object, and finally outputs the information to a fusion apparatus. After processing the information, the fusion apparatus sends the information to a controller, to control vehicle behavior.

A waveform of an FMCW signal of the millimeter-wave radar is usually a sawtooth wave or a triangular wave. In this embodiment of this application, that the FMCW signal is a sawtooth wave is used as an example to describe a ranging principle of the millimeter-wave radar in detail, and a ranging principle of a triangular wave is similar to that of the sawtooth wave.

Figure 3:
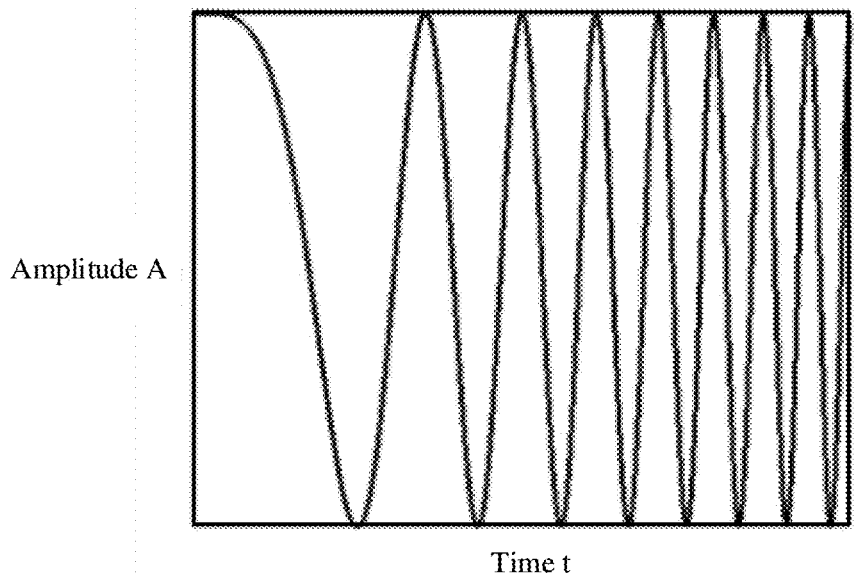
FIG. 3 is a time-amplitude diagram of a frequency-modulated continuous wave according to an embodiment of this application.
Figure 4:
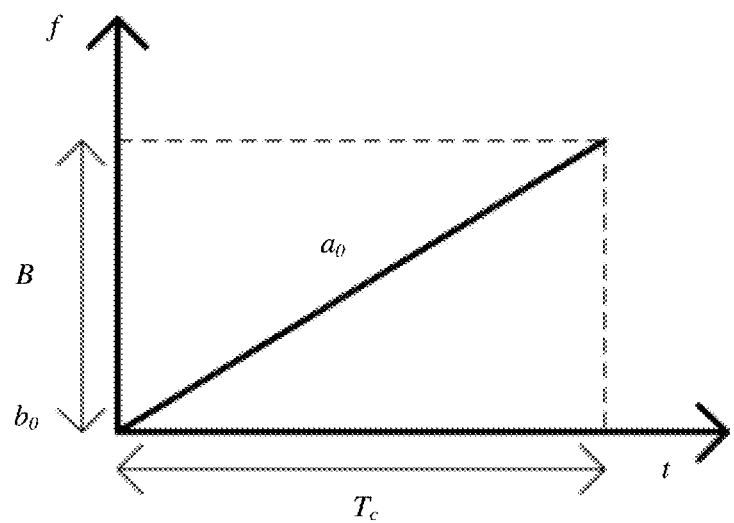
FIG. 4 is a time-frequency diagram of a frequency-modulated continuous wave according to an embodiment of this application.

As shown in FIG. 3, a linear frequency-modulated continuous wave is a signal whose frequency varies linearly with time. As shown in FIG. 4, a period of the frequency-modulated continuous wave is $T_c$, a slope is $a_0$, bandwidth is B, and initial frequency of the frequency-modulated continuous wave is $b_0$. A frequency-modulated continuous wave signal shown in FIG. 3 is also referred to as a chirp signal.

An equivalent baseband signal of a single-period frequency-modulated continuous wave that is output by the oscillator of the millimeter-wave radar may be expressed as follows:

$$S_{BB}^T(t) = A\exp\{j2\pi[\frac{a_0}{2}t^2 + b_0 t + \varphi_0]\}, o \leq t \leq T_c \quad \text{(Formula 1.1)}$$

A represents an amplitude of an equivalent baseband signal, $\alpha_0$ represents a slope of the equivalent baseband signal, $b_0$ represents an intercept of the equivalent baseband signal on a Y axis, $\varphi_0$ represents an initial phase of the equivalent baseband signal, and exp represents an exponential function of e. The frequency is defined as a change rate of a phase relative to a time. Therefore, a frequency of the equivalent baseband signal is as follows:

$$f = \frac{d(\frac{a_0}{2}t^2 + b_0 t + \varphi_0)}{dt} = a_0 t + b_0, o \leq t \leq T_c \quad \text{(Formula 1.2)}$$

An image of Formula 1.2 is shown in FIG. 4.

After up-conversion, the equivalent baseband signal sent by the oscillator is radiated outward by the transmit antenna of the millimeter-wave radar. A transmit signal may be expressed as follows:

$$S_{RF}^T(t) = A\exp\{j2\pi[\frac{a_0}{2}t^2 + b_0 t + \varphi_0]\}\exp(j2\pi f_c t) = \quad \text{(Formula 1.3)}$$
$$A\exp\{j2\pi[\frac{a_0}{2}t^2 + (b_0 + f_c)t + \varphi_0]\}, o \leq t \leq T_c$$

Figure 5:
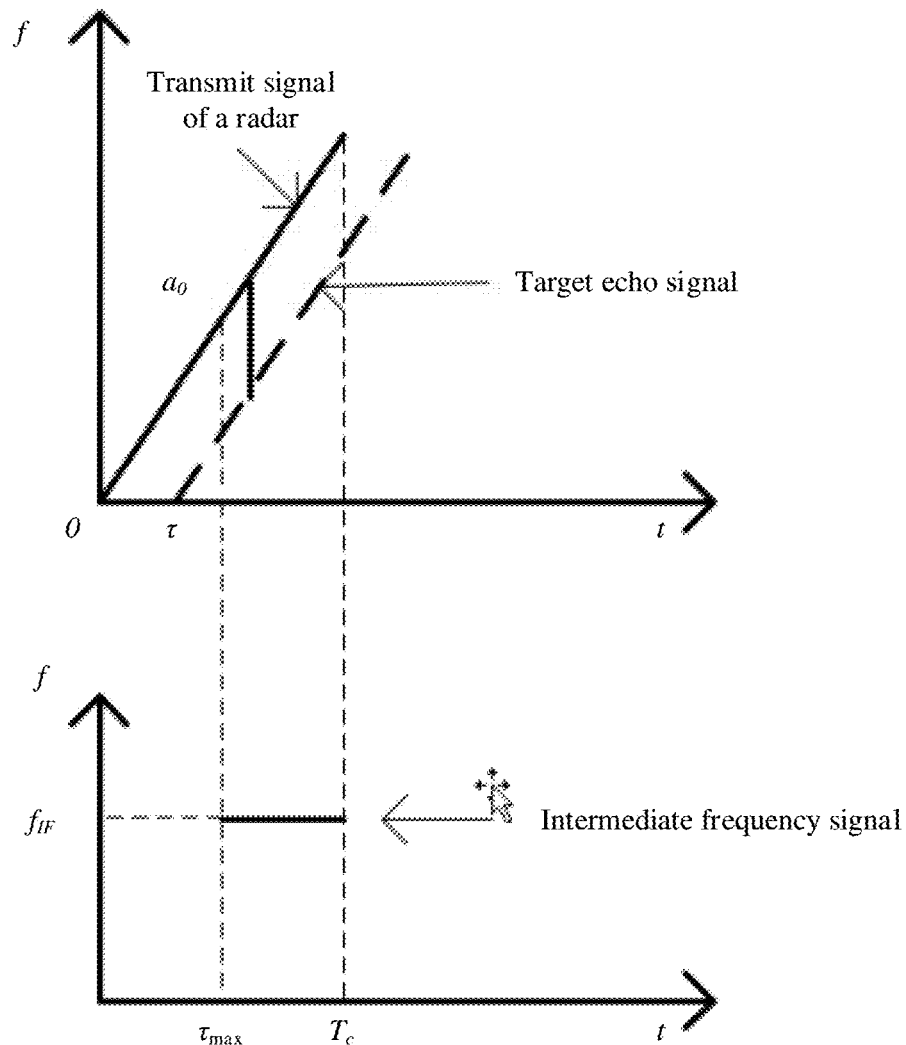
FIG. 5 is a schematic diagram of a relationship between a transmit signal, a receive signal, and an intermediate frequency signal according to an embodiment of this application.

After the signal encounters an obstacle, the signal is reflected and then received by the millimeter-wave radar. A shape of a waveform of a transmit signal is the same as a shape of a waveform of the reflected signal, except that the waveform of the reflected signal has a delay of τ relative to the waveform of the transmit signal. Refer to FIG. 5. In FIG. 5, an echo signal is the reflected signal. The received reflected signal may be expressed as follows:

$$S_{RF}^R(t - \tau) = A'\exp\{j2\pi[\frac{a_0}{2}(t-\tau)^2 + (b_0 + f_c)(t-\tau) + \varphi_0]\}, \quad \text{(Formula 1.4)}$$
$$o \leq t \leq T_c$$

A signal obtained after down-conversion is performed on the received equivalent baseband signal is as follows:

$$S_{BB}^R(t - \tau) = A'\exp\{j2\pi[\frac{a_0}{2}(t-\tau)^2 + b_0(t-\tau) - f_c\tau + \varphi_0]\}, \quad \text{(Formula 1.5)}$$
$$o \leq t \leq T_c$$

A' is an amplitude of a signal obtained after the equivalent baseband signal transmitted by the oscillator undergoes gain of the transmit antenna, reflection by the target, propagation loss, and gain of the receive antenna, and τ is a delay from transmission of a radar signal by a transmitter of the millimeter-wave radar to receiving of an echo signal (that is, a reflected signal) by a receiver of the millimeter-wave radar. As shown in FIG. 5, the delay is twice as large as Distance/Speed of light. In addition, in FIG. 5, $\tau_{max}$ represents an echo delay corresponding to a maximum detection distance of the millimeter-wave radar. To be specific, $\tau_{max}$ is a delay of a reflected signal received by the millimeter-wave radar relative to the transmit signal when a distance between the millimeter-wave radar and the target object is a maximum distance that the millimeter-wave radar can detect. A relationship between τ and a target distance d may be represented as follows:

$$\tau = \frac{2d}{c}, \quad \text{(Formula 1.6)}$$

where c is the speed of light.

The frequency mixer of the millimeter-wave radar performs frequency mixing on the received signal and a local-frequency signal, and outputs an intermediate frequency signal through processing by a low-pass filter. The intermediate frequency signal is represented as follows:

$$S_{IF}(t) = S_{BB}^T(t) \times [S_{BB}^R(t - \tau)]^* = AA'\exp(j2\pi f_c \tau)) \cdot \quad \text{(Formula 1.7)}$$
$$\exp[-j2\pi(\frac{a_0}{2}\tau^2 - b_0\tau)]\exp[j2\pi(a_0\tau t)], \tau \leq t \leq T_c$$

The intermediate frequency signal is sent to the processor of the millimeter-wave radar for processing such as fast Fourier transform, to obtain frequency $f_{IF}$ of the intermediate frequency signal.

In addition, as shown in FIG. 5, the frequency of the intermediate frequency signal is a product of a slope of the waveform of the transmit signal and the delay τ. In other words, $$f_{IF} = a_0 \cdot \tau = \frac{B}{T_c} \cdot \frac{2d}{c} = \frac{2d}{c \cdot T_c}B \quad \text{(Formula 1.8)}$$

Therefore, the distance d between the millimeter-wave radar and the target object is:

$$d = \frac{c \cdot T_c}{2B}f_{IF} \quad \text{(Formula 1.9)}$$

It can be learned from the deduction process that there is a linear relationship between a delay and a frequency difference (namely, the frequency of the intermediate frequency signal) between the transmit signal and the receive signal: A longer distance of the target object indicates a later time of receiving the reflected signal, and therefore indicates a larger frequency difference between the reflected signal and the transmit signal. Therefore, the distance between the radar and the target object may be determined by determining the frequency of the intermediate frequency signal. In addition, the foregoing process of processing the radar signal is merely an example, and a specific radar processing process is not limited, As more vehicle-mounted radars are used, mutual interference between vehicle-mounted radars becomes more severe. Consequently, a radar detection probability is greatly reduced or a false alarm probability of radar detection is increased, posing a non-negligible impact on driving safety or comfort.

Figure 6:
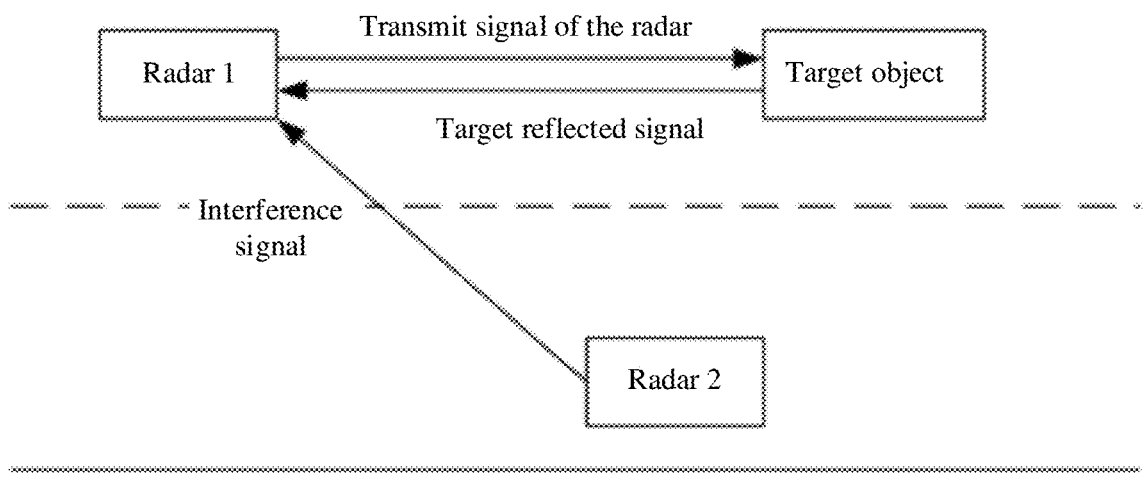
FIG. 6 is a schematic diagram of mutual interference between vehicle-mounted radars according to an embodiment of this application.

FIG. 6 is a schematic diagram of mutual interference between vehicle-mounted radars. A radar 1 transmits a transmit signal, and receives a reflected signal obtained after the transmit signal is reflected on a target object. When the radar 1 receives the reflected signal, a receive antenna of the radar 1 also receives an interference radar signal of a radar 2, and the interference radar signal may be a transmit signal or a reflected signal of the radar 2.

For example, the radar 1 is an observation radar, a slope of a frequency-modulated continuous wave of the radar 1 is $\alpha_0$, an intercept is $b_0$, and a period is $T_c$. The radar 2 is an interference radar, a slope of a frequency-modulated continuous wave of the radar 2 is $\alpha_1$, and an intercept is $b_1$. In this case, it is assumed that $b_0=b_1$. If an echo delay corresponding to a maximum ranging distance of the radar 1 is $\tau_{max}$ (that is, a delay calculated after a maximum detection distance of the radar is substituted into Formula 1.6, for example, if the maximum detection distance of the radar is 250 m, a delay calculated after 250 m is substituted into Formula 1.6 is 1.67 μs), a delay of an interference signal that is of the radar 2 and that arrives at the receiver of the radar 1 is $\tau_1$. It is considered that there is a timing error of $\Delta\tau$ at a transmit moment of the radar (for example, an error at the transmit moment due to a timing error of a global positioning system (GPS) is, for example, 60 ns). A time interval in which the radar detects a receive signal is $\tau_{max}$ to $T_c$.

Figure 7:
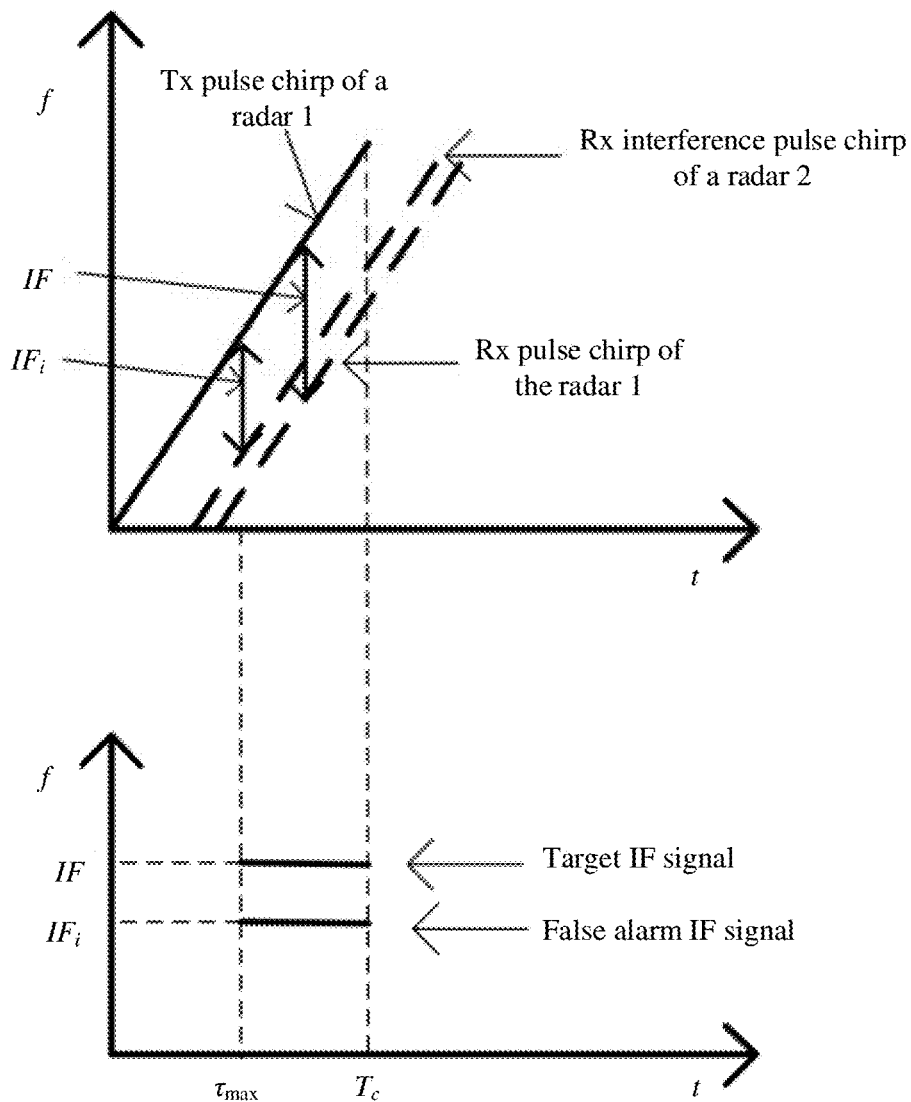
FIG. 7 is a schematic diagram in which a slope of an interfered radar is consistent with that of a current radar according to an embodiment of this application.
Figure 8:
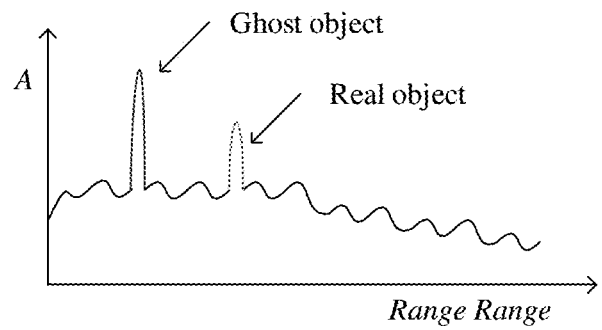
FIG. 8 is a schematic diagram of a distance response when a slope of an interfered radar is consistent with that of a current radar according to an embodiment of this application.

FIG. 7 and FIG. 8 are schematic diagrams of a possible ghost intermediate frequency signal. If a slope of a radar signal sent by the radar 1 is consistent with a slope of a radar signal sent by the radar 2, that is, $\alpha_0=\alpha_1$, and operating bands of the two radar signals overlap, a false alarm occurs. As shown in FIG. 7, the radar 1 transmits a signal to a target object, and receives a reflected signal from the target object. However, in a time range between signal transmitting of the radar 1 and receiving of the reflected signal, a receive antenna of the radar 1 receives a transmit signal or a reflected signal (a dashed line) of the radar 2. A signal waveform of the radar 1 is consistent with a signal waveform of the radar 2, and sweeping bandwidth of the radar 1 and sweeping bandwidth of the radar 2 are the same. In a target echo observation range of the radar 1, if the radar 1 receives a signal shown by a dashed line of corresponding frequency, the radar 1 considers that there is a "target object 1". If the radar 1 detects, in the time interval ($\tau_{max}$ to $T_c$) for signal processing, the signal shown by the dashed line and a reflected signal shown by a solid line, the radar 1 mistakenly considers that the received signal shown by the dashed line is a reflected signal from the object ahead, and in this case, a ghost intermediate frequency signal is generated. After fast Fourier transform is performed, the radar 1 may find two peak values through spectrum analysis. As shown in FIG. 8, each peak value corresponds to one target object, and the radar 1 considers that both the "target object 1" and a "target object 2" exist. The radar 1 mistakenly considers that the "target object 1" exists in front, but the "target object 1" does not exist actually. This is referred to as a "ghost" or a "false alarm". After the false alarm occurs, an autonomous vehicle slows down or brakes suddenly when there is no object in front. Consequently, driving comfort is reduced.

Figure 9:
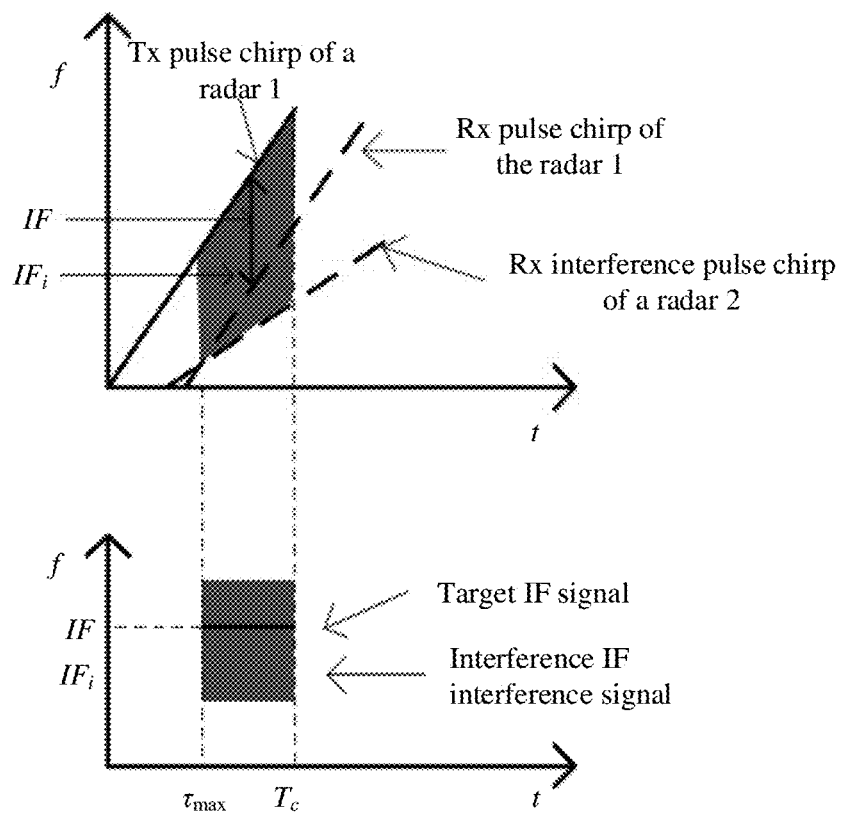
FIG. 9 is a schematic diagram in which a slope of an interfered radar is inconsistent with that of a current radar according to an embodiment of this application.
Figure 10:
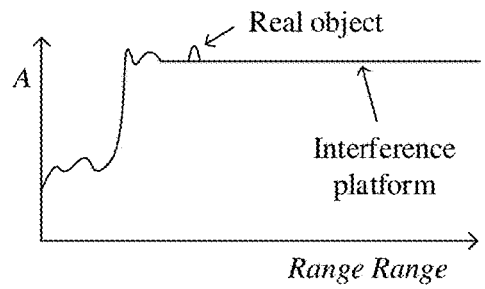
FIG. 10 is a schematic diagram of a distance response when a slope of an interfered radar is inconsistent with that of a current radar according to an embodiment of this application.

FIG. 9 and FIG. 10 are possible schematic diagrams showing that an interference signal submerges a target signal. As shown in FIG. 9, the radar 1 transmits a signal to the target object, and receives a reflected signal from the target object. However, in a target echo observation range of the radar 1, a receive antenna of the radar 1 receives a transmit signal or a reflected signal (a dashed line) of the radar 2. There is a difference between a signal waveform of the radar 1 and a signal waveform of the radar 2 in terms of slope. In the time interval ($\tau_{max}$ to $T_c$) for signal detection, the radar 1 simultaneously detects a reflected signal of the radar 1 and a related signal of the radar 2, and generates, after mixing the detected related signal of the radar 2 and the detected reflected signal of the radar 1, an intermediate frequency signal including various frequency components. After fast Fourier transform, as shown in FIG. 10, an interference platform appears. Consequently, a "protrusion" degree of the real target object is not enough, detection is made difficult, and a possibility of detection missing is improved. After missing detection occurs, when there is an object in front of an autonomous vehicle, the autonomous vehicle mistakenly considers that there is no object, and does not decelerate or brake. Consequently, a traffic accident is caused, and vehicle driving safety is reduced.

Figure 11:
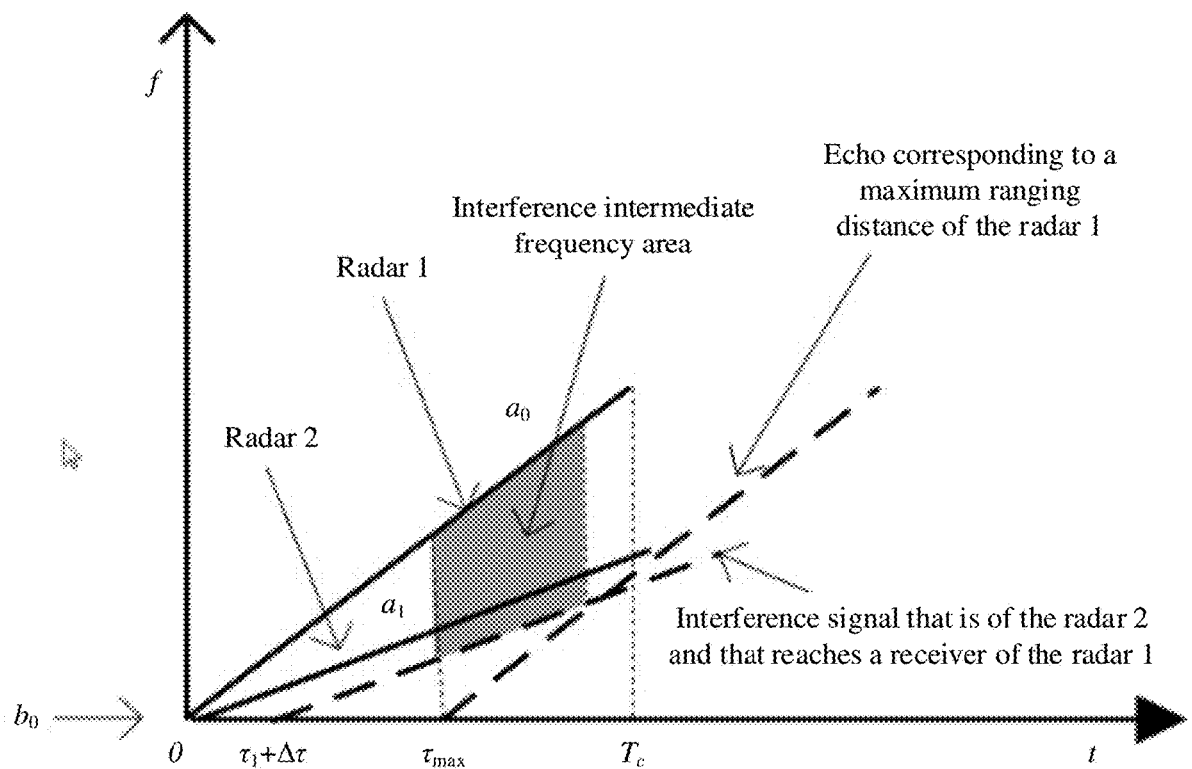
FIG. 11 is a schematic diagram in which a radar with a small slope interferes with a radar with a large slope according to an embodiment of this application.

Specifically, there is a difference between the signal waveform of the radar 1 and the signal waveform of the radar 2 in terms of slope. If a waveform slope of the radar 1 is $\alpha_0$, and a waveform slope of the radar 2 is $\alpha_1$, a difference between the two slopes may be divided into the following two cases:

When $\alpha_1<\alpha_0$, as shown in FIG. 11, an interference platform problem occurs, and consequently, a problem of detection missing is caused.

Figure 12:
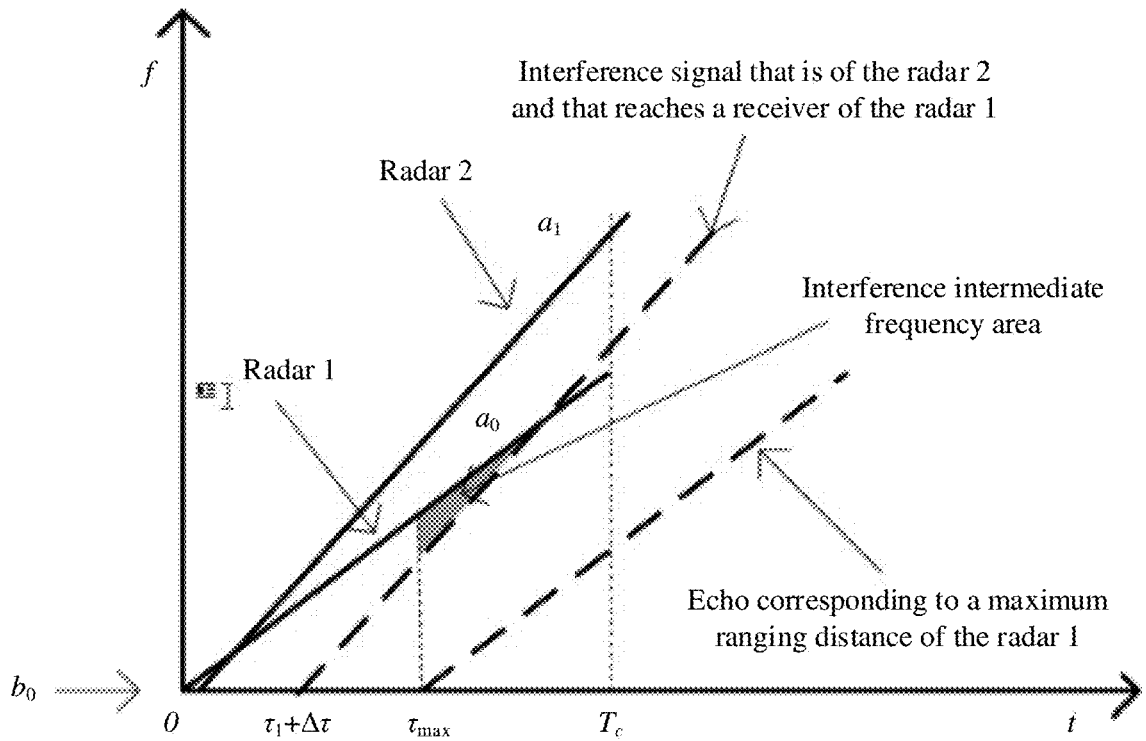
FIG. 12 is a schematic diagram in which a radar with a small slope interferes with a radar with a large slope according to an embodiment of this application.

When $\alpha_1>\alpha_0$ as shown in FIG. 12, the interference platform problem also occurs, and consequently, the problem of detection missing is caused.

Figure 13:
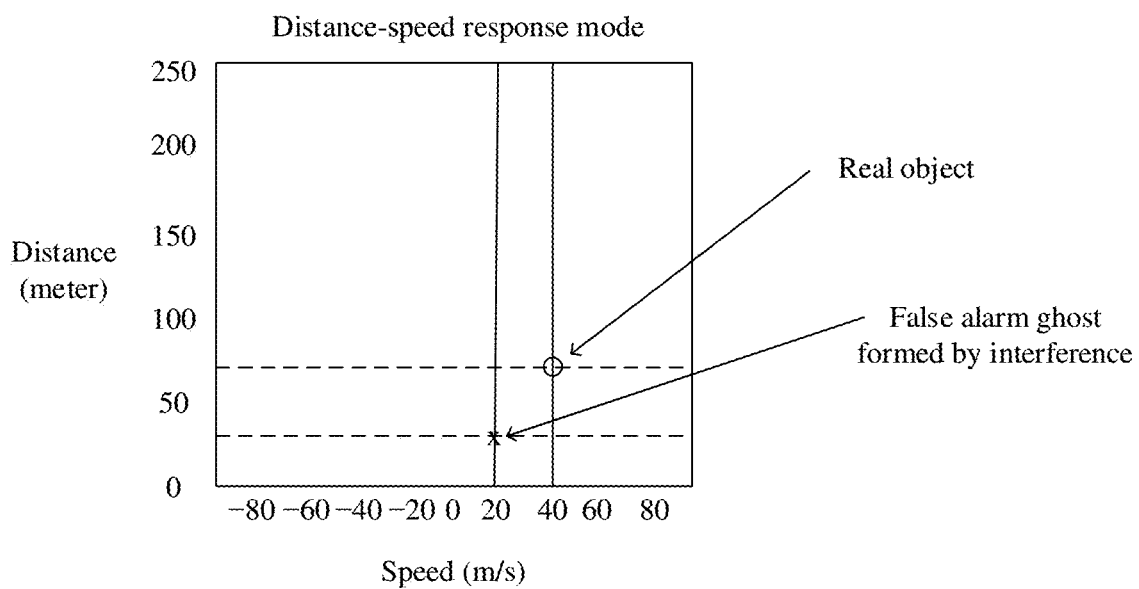
FIG. 13 is a schematic diagram of same-slope interference according to an embodiment of this application.
Figure 14:
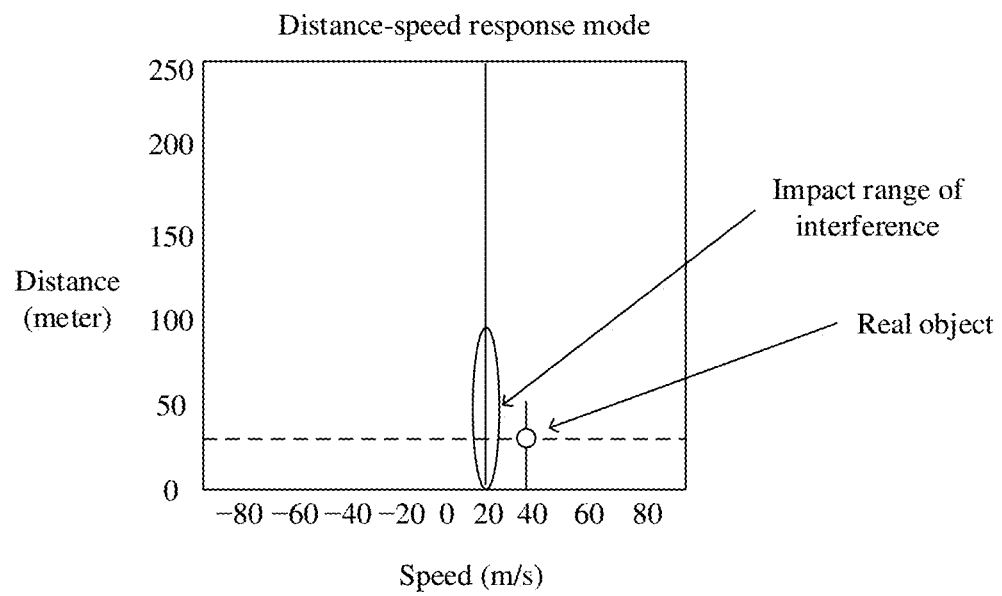
FIG. 14 is a schematic diagram of different-slope interference according to an embodiment of this application.
Figure 15:
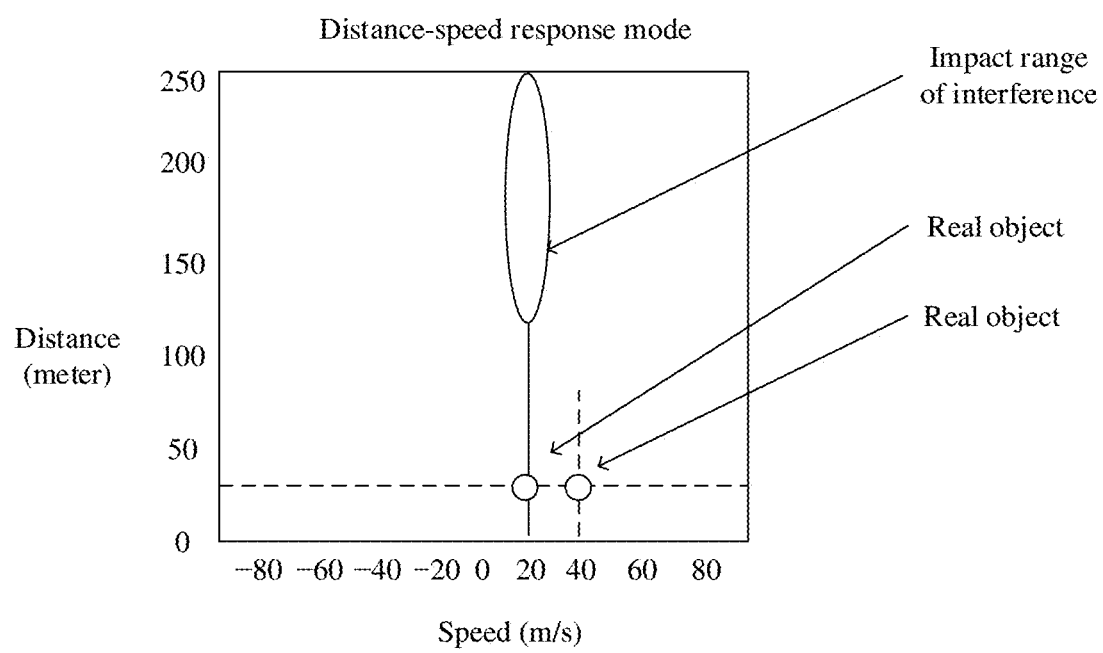
FIG. 15 is a schematic diagram of different-slope interference according to an embodiment of this application.

As shown in FIG. 13, same-slope interference is embodied as a ghost target in a distance-speed detection result of a radar, and the target is a ghost target that originally does not exist. Different-slope interference is embodied as an interference platform in the distance-speed detection result of the radar. The interference platform may affect target detection in a specific range. As shown in FIG. 14, there are two targets at a distance of 30 meters. Interference affects detection in a specific speed dimension (20 m/s) and a distance dimension range (0 meters to 80 meters). The presence of interference affects a detection result of one of the targets, and a missed alarm is caused. For a different interference impact range, as shown in FIG. 15, the interference affects a specific speed dimension (20 m/s) and a distance dimension range (120 meters to 250 meters), detection results of the two targets at the distance of 30 meters are not affected.

The millimeter-wave radar is a main sensor for unmanned driving. A detection result of the millimeter-wave radar is usually transmitted to a fusion apparatus, and is fused with a detection result of a camera or a laser radar, to improve perception robustness. As more vehicle-mounted radars are used, mutual interference between the vehicle-mounted radars becomes increasingly more severe. If the radar outputs a detection result indicating that the radar is interfered with to the fusion apparatus, determining of a real situation by the fusion apparatus may be affected, and non-negligible impact is caused to safety.

Figure 16:
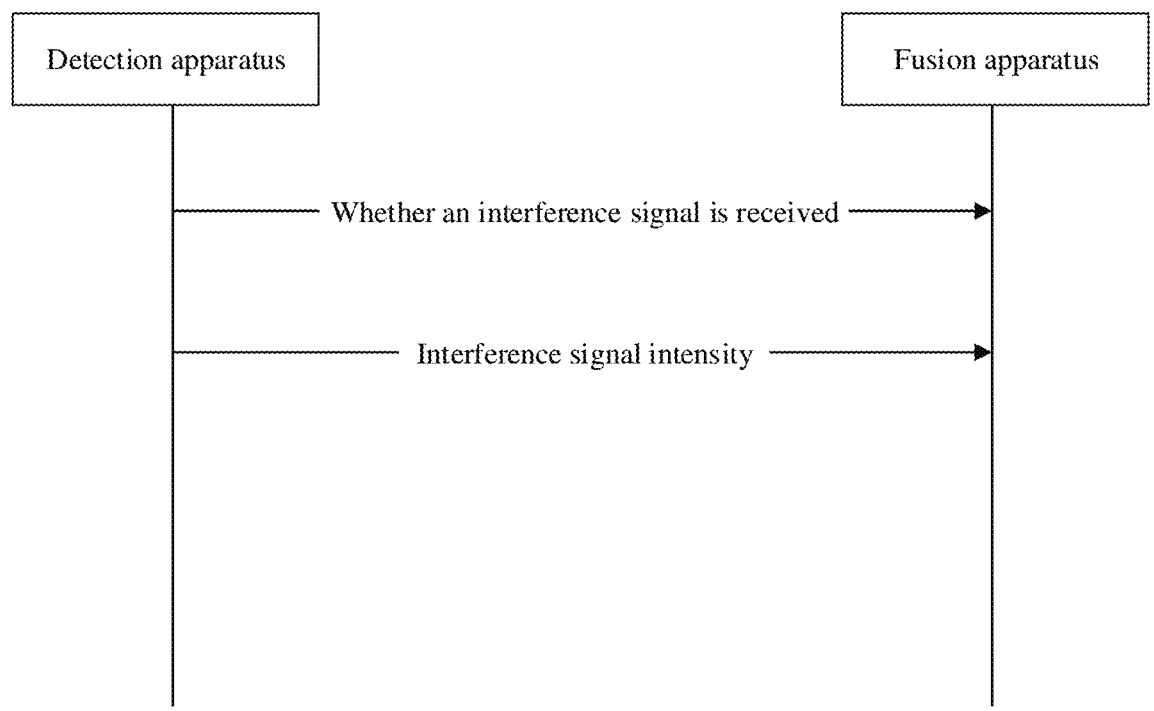
FIG. 16 is a schematic diagram of a solution for interference reporting according to an embodiment of this application.

To resolve the foregoing problems, in a possible solution, as shown in FIG. 16, the radar outputs not only a target detection result to the fusion apparatus, but also outputs indication information such as "whether the radar is interfered with" and "interference signal intensity" to the fusion apparatus, so that a fusion module can learn information such as whether the target detection result output by the radar is interfered with and interference intensity.

A distance-speed detection result of an FWCM radar is used as an example. Interference generally affects only a distance-speed interval in a specific range, and does not affect a distance-speed interval in another range. For example, as shown in FIG. 14 and FIG. 15, it is not accurate if only "whether an interference signal is received" is used for description. For example, as shown in FIG. 15, although the radar is interfered with when detecting a target, an impact range of interference does not affect detection of two targets at a distance of 30 meters of the radar. In other words, a current target detection result is accurate. However, in the foregoing possible solutions, if the radar reports that the current detection result is interfered with and reports indication information such as interference intensity, the fusion apparatus reduces confidence of the current target detection result at the distance of 30 meters (but actually, the two target detection results at the distance of 30 meters are credible). Consequently, the fusion apparatus is not used for further determining, and target detection accuracy of the fusion apparatus is reduced. In view of this, an embodiment of this application provides a solution. In this solution, in addition to reporting a target detection result, a detection apparatus further reports indication information such as an impact range of interference to the fusion apparatus, so that it is convenient for the fusion apparatus to determine whether the target detection result currently reported by the detection apparatus is interfered with, and target detection accuracy of the fusion apparatus is improved.

Figure 17:
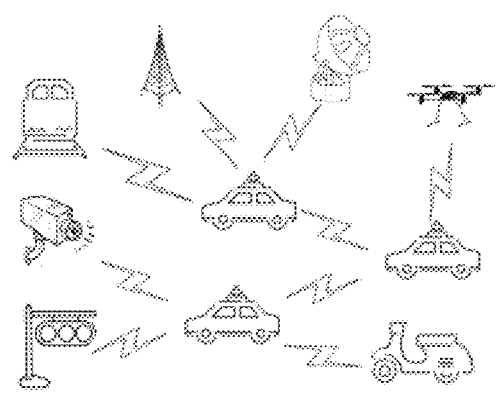
FIG. 17 is a schematic diagram of a system architecture and a scenario to which an embodiment of this application is applicable.

As shown in FIG. 17, a schematic diagram of a possible application scenario is provided. The foregoing application scenario may be a scenario such as unmanned driving, automatic driving, intelligent driving, or networked driving. A detection apparatus (for example, the detection apparatus 101 in FIG. 1) in this embodiment of this application may be installed in a motor vehicle (for example, an unmanned vehicle, an intelligent vehicle, an electric vehicle, or a digital vehicle), an unmanned aerial vehicle, a rail vehicle, a bicycle, a signal lamp, a speed measurement apparatus, or a network device (for example, a base station or a terminal device in various systems). In addition, in addition to the detection apparatus, a fusion apparatus (for example, the fusion apparatus 102 in FIG. 1) and a controller (for example, the controller 103 in FIG. 1) may be installed on the apparatus. This is not specifically limited. This embodiment of this application is applicable to a detection apparatus between vehicles, a detection apparatus between a vehicle and another apparatus such as an unmanned aerial vehicle, or a detection apparatus between other apparatuses. In addition, the detection apparatus, the fusion apparatus, and the controller may be installed on a mobile device, for example, the detection apparatus is installed on a vehicle as a vehicle-mounted radar detection apparatus or a radar detection apparatus, and the fusion apparatus and the controller may be installed on a fixed device, for example, are installed on a device such as a roadside unit (road side unit, RSU). Installation locations and functions of the detection apparatus, the fusion apparatus, and the controller are not limited in this embodiment of this application.

It should be noted that in the descriptions of this application, words such as "first" and "second" are merely used for distinguished descriptions, and cannot be understood as an indication or implication of relative importance, and cannot be understood as an indication or implication of a sequence, for example, "first signal", "second range", "first value", and "second value". A term "and/or" describes an association relationship between associated objects and indicates that three relationships may exist. For example, A and/or B may indicate the following cases: Only A exists, both A and B exist, and only B exists. A and B may be singular or plural. At least one (piece) of a, b, or c may indicate a; b; c; a and b; a and c; b and c; or a, b, and c, where a, b, and c may be singular or plural.

Figure 18:
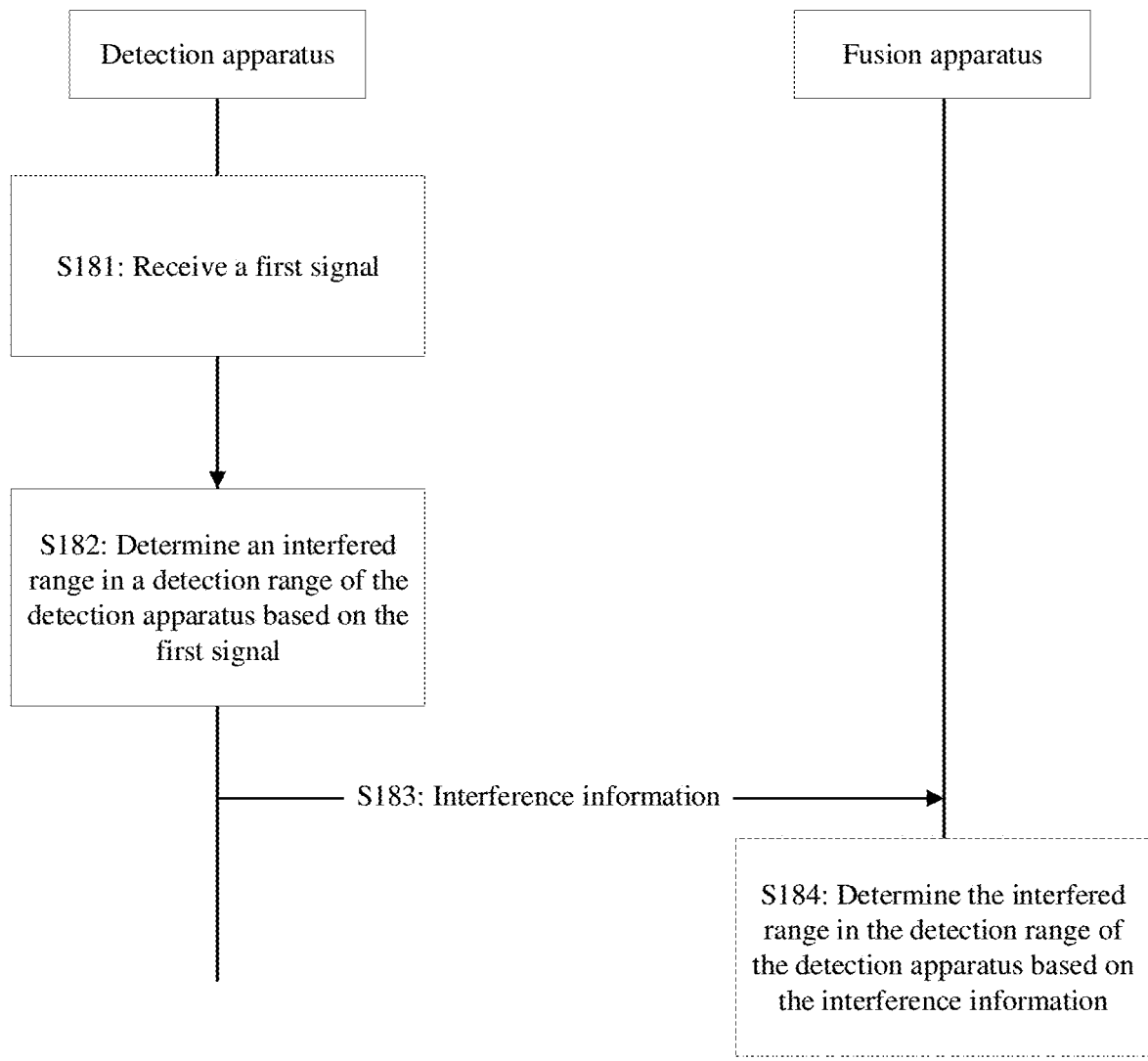
FIG. 18 is a schematic diagram of an information reporting and receiving method according to an embodiment of this application.

As shown in FIG. 18, a flowchart of an information reporting and receiving method is provided. A detection apparatus and a fusion apparatus in a procedure shown in FIG. 18 may be applied to the scenario shown in FIG. 17. Alternatively, the detection apparatus in the procedure shown in FIG. 18 may be the detection apparatus 101 shown in FIG. 1, and the fusion apparatus may be the fusion apparatus 102 shown in FIG. 1. The procedure shown in FIG. 18 may be performed by the detection apparatus and the fusion apparatus. The detection apparatus may be a radar (or referred to as a radar apparatus), or the detection apparatus may be a chip installed on a detection device, and the detection device is, for example, a radar (or a radar apparatus) or another device. The fusion apparatus may be an MDC (or referred to as an MDC apparatus), or the MDC may be a chip installed on a control device, and the control device is, for example, an MDC (or an MDC apparatus) or another device. The procedure includes the following steps.

S181: The detection apparatus receives a first signal. Specifically, the detection apparatus may receive the first signal through a receive antenna.

For example, when detecting a target, the detection apparatus may transmit a signal. When reaching a target object, the transmit signal is reflected by the target object to form a reflected signal. The detection apparatus may receive the reflected signal. In addition, when receiving the foregoing target reflected signal, the detection apparatus may further receive an interference signal from another detection apparatus. The first signal in S181 may be the target reflected signal, the first signal is superposition of the target reflected signal and the interference signal, the first signal is merely the interference signal, or the like. This is not limited. For example, as shown in FIG. 6, that the detection apparatus is the radar 1 is used as an example for description. The radar 1 may transmit a signal, and when reaching a target object, the transmit signal is reflected by the target object to form a target reflected signal. When receiving the target reflected signal, the radar 1 also receives an interference radar signal of the radar 2, and the interference radar signal may be a transmit signal or a reflected signal of the radar. In the example shown in FIG. 6, the first signal in S181 is superposition of the target reflected signal and the interference radar signal.

S182: The detection apparatus determines an interfered range in a detection range of the detection apparatus based on the first signal.

For example, after receiving the first signal through the receive antenna, the detection apparatus may mix the first signal with a local-frequency signal to obtain an intermediate frequency signal, perform low-pass filtering and amplification processing on the intermediate frequency signal, and perform fast Fourier transform and spectrum analysis on the intermediate frequency signal, to obtain a detection result. The detection result may be three-dimensional. For example, the detection result may include a speed dimension, a distance dimension, and an angle dimension. Alternatively, the detection result may be two-dimensional. For example, the detection result may include any two of a speed dimension, a distance dimension, and an angle dimension. Alternatively, the detection result may be one-dimensional. For example, the detection result may include a speed dimension, a distance dimension, or an angle dimension. When the detection result is two-dimensional, and includes a distance dimension and a speed dimension (or the detection result may be described as a distance-speed detection result), refer to FIG. 13, FIG. 14, or FIG. 15 for the detection result. The detection apparatus may obtain the interfered range in the detection range of the detection apparatus based on the detection result. For example, in a specific speed dimension in the distance-speed detection result, if signal intensity values in some consecutive distance dimensions are extremely large, and a difference between values at different distances is extremely small, it may be considered that the range is the interfered range, and how the detection apparatus determines the interfered range is not specifically limited. For example, as shown in FIG. 14 or FIG. 15, for the interfered range, refer to an "oval" area in FIG. 14 or FIG. 15.

Figure 22:
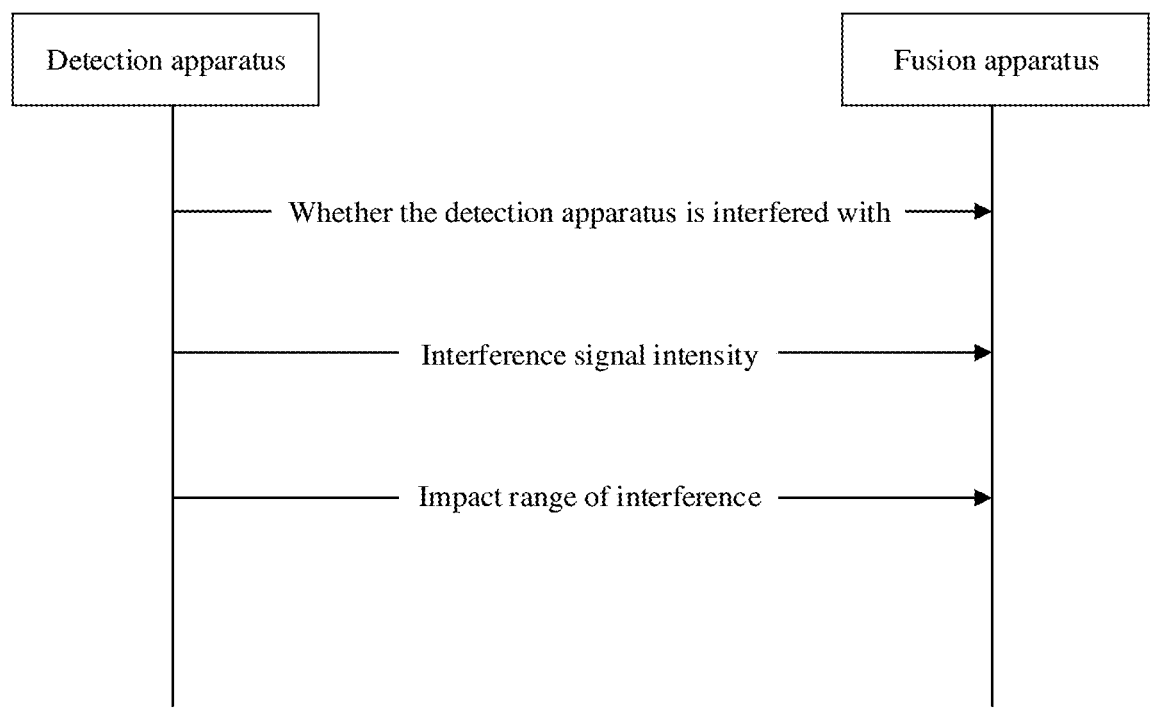
FIG. 22 is a flowchart of interference reporting according to an embodiment of this application.
Figure 23:
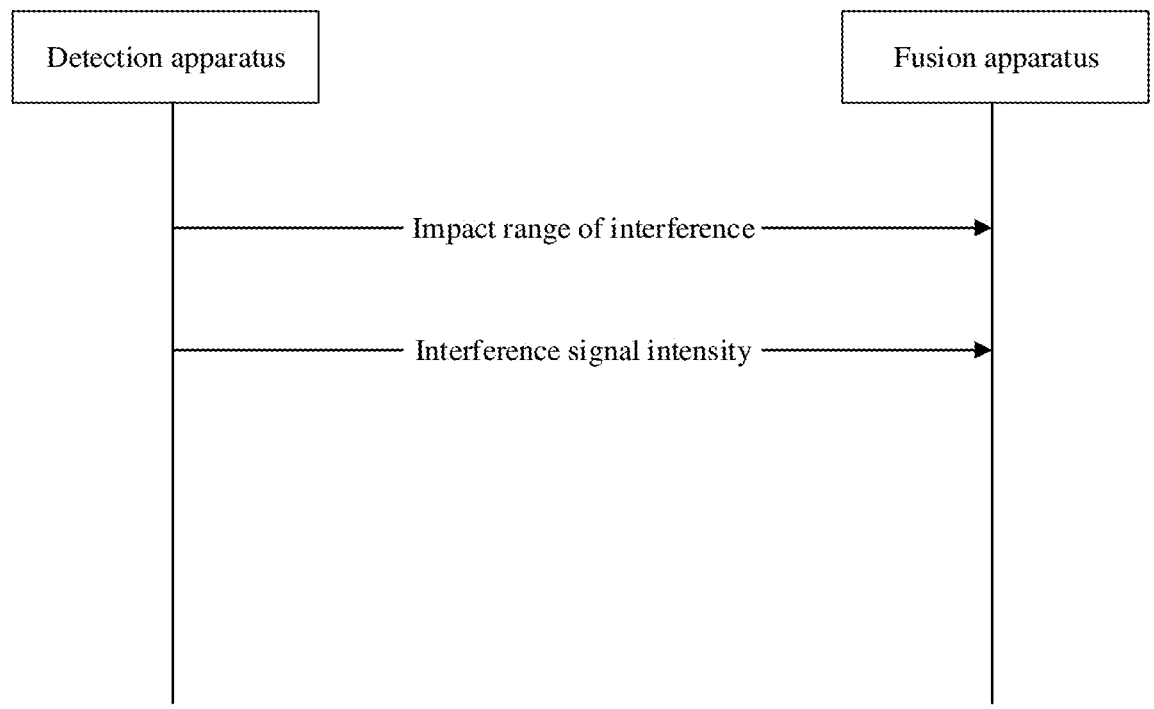
FIG. 23 is a flowchart of interference reporting according to an embodiment of this application.

S183: The detection apparatus sends interference information to the fusion apparatus, where the interference information includes indication information of the interfered range. Correspondingly, the fusion apparatus receives the interference information. Optionally, in addition to reporting the indication information such as the interfered range to the fusion apparatus, the detection apparatus may further report indication information such as whether the detection apparatus is interfered with, interference intensity, and an interference time range to the fusion apparatus. For example, as shown in FIG. 22, the detection apparatus may report indication information such as "whether an interference signal is received", "interference signal intensity", and "an impact range of interference" to the fusion apparatus. Alternatively, as shown in FIG. 23, once the impact range of interference is output, the detection apparatus is definitely interfered with. Therefore, the detection apparatus may report only indication information such as "an impact range of interference and interference signal intensity" to the fusion apparatus.

It may be understood that the detection apparatus may separately report "indication information of the interfered range", "indication information of whether the detection apparatus is interfered with", "indication information of interference intensity", and "indication information of the interference time range" to the fusion apparatus. Alternatively, the detection apparatus may add "indication information of the interfered range", "indication information of whether the detection apparatus is interfered with", "indication information of interference intensity", and/or "indication information of the interference time range" to one piece of interference information and reports the interference information. In other words, the interference information may include one of "indication information of the interfered range", "indication information of whether the detection apparatus is interfered with", "indication information of interference intensity", or "indication information of the interference time range".

It should be noted that, in this embodiment of this application, the detection apparatus may report all the foregoing indication information by using an original interface with the fusion apparatus. Alternatively, one interface with the fusion apparatus may be added to the detection apparatus, to report all the foregoing indication information. Alternatively, the detection apparatus may report a part of the indication information by using the original interface, and report the other part of the indication information by using the newly added interface. For example, the indication information such as "whether the detection apparatus is interfered with" and "the interference signal intensity" may be reported by using the original interface, and the indication information such as "the interfered range" and "the interference time range" may be reported by using the newly added interface. The interference time range may be specifically a time period, for example, 8 o'clock 10 microseconds to 8 o'clock 15 microseconds, or the interference time range may be specifically duration, for example, 15 μs or 20 μs.

For example, the detection result shown in FIG. 15 is used as an example to describe, in detail, advantages of the solution provided in FIG. 18 in this embodiment of this application. As shown in FIG. 15, the detection apparatus detects two targets at a distance of 30 m, and speeds are respectively 20 m/s and 40 m/s. In addition, as shown in FIG. 15, the detection apparatus is interfered with in the detection range of the detection apparatus. For details, refer to the "oval" area shown in FIG. 15.

A first solution is as follows: The detection apparatus reports the target detection result and the indication information such as "the detection apparatus is interfered with" and "the interference intensity" to the fusion apparatus. After receiving the target detection result, the fusion apparatus may determine that there are two targets at a distance of 30 meters from the detection apparatus, and speeds relative to the detection apparatus are respectively 20 m/s and 40 m/s. In addition, the fusion apparatus may determine, according to the indication information reported by the detection apparatus, that the current target detection result of the detection apparatus is interfered with. The fusion apparatus may reduce confidence of the detection result reported by the detection apparatus. For example, another visual sensor such as a camera other than the detection device reports, to the fusion apparatus, that no target detection result is detected at the distance of 30 m. The fusion apparatus may choose to trust a target detection result of the another visual sensor more. For example, the fusion apparatus may determine, based on weighted values of 7:3, whether there is a target at the distance of 30 m ahead. The weighted value 3 is the target detection result of the detection apparatus, and the weighted value 7 is the target detection result of the another visual sensor.

A second solution is as follows: The detection apparatus reports the target detection result and the indication information such as "the interfered range" by using the method in the procedure shown in FIG. 18. Similarly, after receiving the target detection result, the fusion apparatus may determine that there are two targets at a distance of 30 meters from the detection apparatus, and speeds relative to the detection apparatus are respectively 20 m/s and 40 m/s. Further, the fusion apparatus determines an interfered range in the detection result according to the indication information. The fusion apparatus may learn, through analysis, that current interference does not affect the target detection result. The fusion apparatus does not reduce confidence of the detection result reported by the detection apparatus. For example, the fusion apparatus may still determine, based on weighted values of 5:5, whether there is a target at the distance of 30 m ahead.

It may be found by comparing the first solution with the second solution that, in the method in the procedure shown in FIG. 18, the target detection result of the fusion apparatus is more accurate, and it is convenient for the controller to control a vehicle, to improve driving safety.

Another scenario is as follows: The detection apparatus reports a first target detection result to the fusion apparatus, where the first target detection result is that there is a target at a distance of 100 m ahead. Another sensor such as a camera reports a second target detection result to the fusion apparatus, where the second detection result is that no target is detected at the distance of 100 m ahead. After receiving the first target detection result and the second target detection result, the fusion apparatus may determine, based on weighted values of 5:5, whether there is a target at 100 m ahead. In the method in the procedure shown in FIG. 18 is used, the detection apparatus further reports the indication information of the interfered range. The fusion apparatus is set to determine, according to the indication information, that the interfered range is 90 meters to 100 meters. In other words, a detection result of the detection apparatus at 90 m to 100 m is interfered with. In this case, the fusion apparatus may trust the second target detection result of the another sensor such as the camera more. For example, the fusion apparatus may determine, based on weighted values of 7:3, whether there is a target at 100 m ahead. The weighted value 7 is the second target detection result reported by the another sensor such as the camera, and the weighted value 3 is the first target detection result reported by the detection apparatus. It can be learned from the foregoing analysis that, in the method in the procedure shown in FIG. 18, target detection accuracy of the fusion apparatus can be improved, so that it is convenient for the controller to control the vehicle, to reduce occurrence of traffic accidents.

It can be learned from the foregoing analysis that, in the method in the procedure shown in FIG. 18, target detection accuracy of the fusion apparatus can be improved, so that it is convenient for the controller to control the vehicle, to reduce traffic accidents and improve driving safety.

Optionally, in the procedure shown in FIG. 18, the method may further include: S184: The fusion apparatus determines the interfered range in the detection range of the detection apparatus based on the interference information.

Further, it may be learned from the foregoing descriptions that the detection result of the detection apparatus may include any one of a distance dimension, a speed dimension, or an angle dimension. The interfered range in S183 or S184 is specifically an interfered range/area in the detection range in the detection result of the detection apparatus. Therefore, the interfered range in this embodiment of this application may include any one or more of a distance dimension, a speed dimension, or an angle dimension. For example, the interfered range shown in FIG. 14 may include a distance dimension and a speed dimension, an interfered distance range is 0 m to 80 m, and an interfered speed range is 20 m/s (the oval area in FIG. 14). Alternatively, the interfered range shown in FIG. 15 also includes a distance dimension and a speed dimension, an interfered distance range is 100 m to 250 m, and an interfered speed range is 20 m/s (the oval area in FIG. 15).

Example 1: The interfered distance range is represented by a distance interval, the interfered speed range is represented by a speed interval, and/or the interfered angle range is represented by an angle interval. Alternatively, the foregoing process may be expressed as follows: The interfered range is determined by at least one of an interfered distance interval, an interfered speed interval, or an interfered angle interval. For example, the interfered range may be represented by a group of intervals, and the interval may include at least one of a distance interval, a speed interval, or an angle interval. For example, the interfered range may include a distance dimension, and the interfered distance interval may be represented as [0 m to 20 m] and [100 m to 150 m], or the interfered distance interval may be represented as [0 m to 20 m]. Alternatively, the interfered range may include a speed dimension, and the interfered speed interval may be represented as [10 m/s to 150 m/s]. Alternatively, the interfered range may include a distance dimension and a speed dimension, an interfered distance interval may be represented as [0 m to 20 m], and an interfered speed interval may be represented as [10 m/s to 150 m/s]. Alternatively, the interfered range may include a distance interval and an angle interval, an interfered distance interval may be represented as [0 m to 20 m], and an interfered angle interval may be represented as [10° to 20°]. Alternatively, the interfered range may be represented as a distance interval, an angle interval, and a speed interval, an interfered distance interval may be represented as [0 m to 20 m], an interfered speed interval may be represented as [10 m/s to 50 m/s], and an interfered angle interval may be represented as [10° to 20°].

For example, in this embodiment of this application, at least one of the interfered distance interval, the interfered speed interval, or the interfered angle interval may alternatively be represented as a one-dimensional, two-dimensional, or three-dimensional matrix. For example, the interfered range includes a distance dimension, a speed dimension, and an angle dimension. The interfered distance interval is [0 m to 20 m], the interfered speed interval is [10 m/s to 150 m/s], and the interfered angle interval is [10° to 20°]. In this case, the foregoing interval may be represented as the following two-dimensional matrix:

$$\begin{bmatrix} 0 & 20 \\ 10 & 15 \\ 10 & 20 \end{bmatrix} \text{ or } \begin{bmatrix} 0 & 10 & 10 \\ 20 & 15 & 20 \end{bmatrix}.$$

Alternatively, the interfered range includes a distance dimension, a speed dimension, and an angle dimension. The interfered distance interval is represented as [0 m to 20 m] and [100 m to 150 m], the interfered speed interval is represented as [10 m/s to 15 m/s] and [25 m/s to 28 m/s], and the interfered angle interval is represented as [10° to 20°] and [30° to 35°]. In this case, the foregoing interval may be represented as the following two-dimensional matrix:

$$\begin{bmatrix} 0 & 10 & 10 \\ 20 & 15 & 20 \\ 100 & 25 & 30 \\ 150 & 28 & 35 \end{bmatrix} \text{ or } \begin{bmatrix} 0 & 20 & 100 & 150 \\ 10 & 15 & 25 & 28 \\ 10 & 20 & 30 & 35 \end{bmatrix}.$$

In this example, the interval is used, so that the interfered range in the detection result of the detection apparatus can be more accurately described, and target detection accuracy of the fusion apparatus can be increased.

Optionally, in this example, in addition to the indication information of the interfered range, the interference information in S183 or S184 may further include interference intensity information. The interference intensity information may correspond to at least one of the interfered distance range/distance interval, the interfered speed range/speed interval, or the interfered angle range/angle interval. Interference intensity corresponding to the interfered distance range, the interfered speed range, and the interfered angle range may be the same or different. For example, if the interference intensity corresponding to the interfered distance range, the interfered speed range, and the interfered angle range is the same, the interference information in S183 or S184 may include only one piece of interference intensity. If the interference intensity corresponding to the interfered distance range, the interfered speed range, and the interfered angle range is different, the interference information in S183 or S184 may include three pieces of interference intensity respectively corresponding to the interfered distance range, the interfered speed distance, and the interfered angle range.

For the example 1, a specific implementation of S184 may be as follows: The fusion apparatus determines the interfered range in the detection range of the detection apparatus based on at least one of the interfered distance interval, the interfered speed interval, or the interfered angle interval.

Example 2: The interfered distance range is represented by a distance dimension, the interfered speed range is represented by a speed dimension, and the interfered angle range is represented by an angle dimension. The foregoing process may be further described as follows: The interfered range may be determined by using a matrix represented by at least one of an interfered distance dimension, an interfered speed dimension, an interfered angle dimension, or the like. For example, the affected range may be a two-dimensional matrix, and two dimensions of the two-dimensional matrix may be a distance dimension and a speed dimension, or two dimensions of the two-dimensional matrix may be a distance dimension and an angle dimension. Alternatively, the impact range of interference may be a three-dimensional matrix, and three dimensions of the three-dimensional matrix may be a distance dimension, a speed dimension, and an angle dimension.

For example, a two-dimensional matrix of a distance dimension and a speed dimension is used as an example. A range of each dimension is a detection range of the detection apparatus, and a granularity is resolution of each dimension. For example, a detection distance in the distance dimension in the two-dimensional matrix is 0 meters to 250 meters, and a granularity is that distance resolution of the detection apparatus is 0.5 meter. A detection speed in the speed dimension in the two-dimensional matrix is 0 m/s to 50 m/s, and a granularity is that speed resolution of the detection apparatus is 0.5 m/s. Therefore, a dimension of the two-dimensional matrix is 500×100.

Optionally, an element value of the matrix may represent interference intensity information. Further, at least one of the interfered distance range, the interfered speed range, or the interfered angle range is determined by using at least one of a distance dimension, a speed dimension, or an angle in which an element that is in the matrix and whose element value belongs to a first range is located. For example, the first range may be an integer greater than 0. For example, the first range may include a first value and a second value, and if the first value is greater than the second value, interference intensity represented by the first value is greater than interference intensity represented by the second value.

Figure 19:
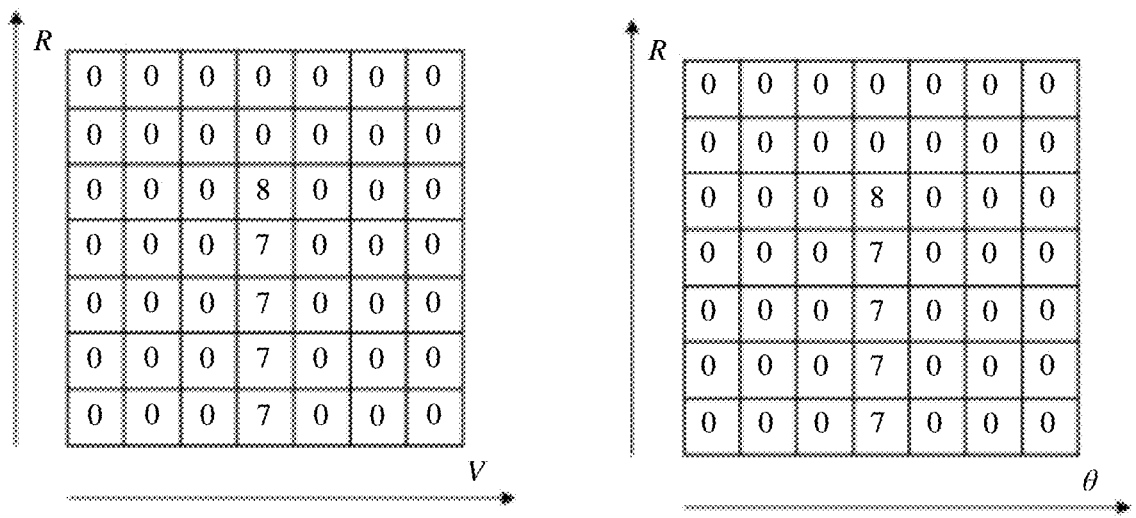
FIG. 19 is a schematic diagram of a distance-speed matrix and a distance-angle matrix according to an embodiment of this application.

For example, in this embodiment of this application, as shown in FIG. 19, a two-dimensional matrix of a speed dimension and a distance dimension is used as an example. Each element value in the matrix is an interference information intensity value, 0 indicates that there is no interference at this point, and a larger value indicates stronger interference.

In this example, the matrix is used, so that the interfered range in the detection result of the detection apparatus can be more accurately described, and target detection accuracy of the fusion apparatus can be increased.

For the example 2, a specific implementation of S184 is as follows: The fusion apparatus determines the interfered range in the detection range of the detection apparatus based on a matrix represented by at least one of the interfered distance dimension, the interfered speed dimension, or the interfered angle dimension. An element value of the matrix represents interference intensity information, and at least one of the interfered distance range, the interfered speed range, or the interfered angle range is determined by using at least one of a distance dimension, a speed dimension, or an angle dimension in which an element that is in the matrix and whose element value belongs to a first range is located.

Figure 20:
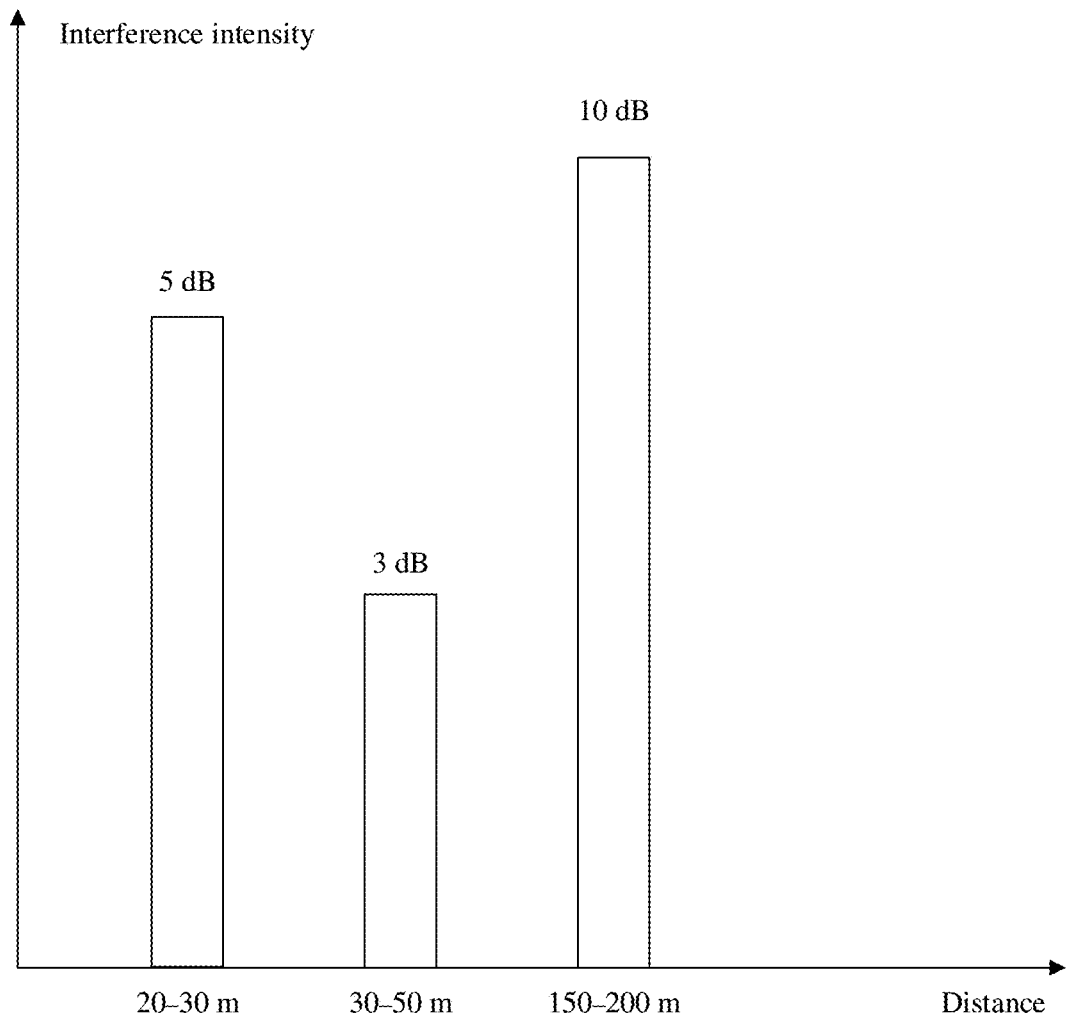
FIG. 20 is a statistical histogram of an interference range of a detection apparatus according to an embodiment of this application.
Figure 21:
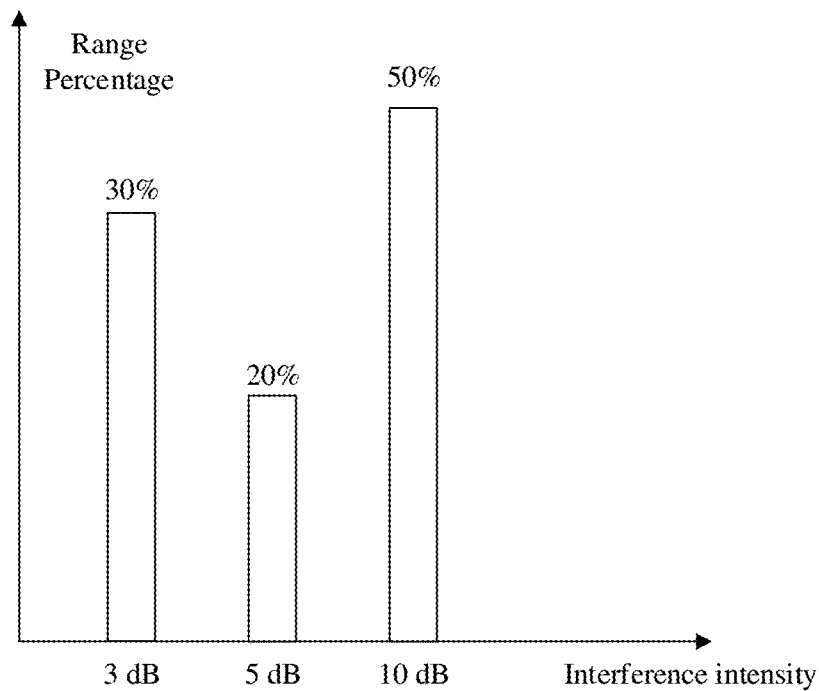
FIG. 21 is a statistical histogram of an interference range of a detection apparatus according to an embodiment of this application.

Example 3: The impact range of interference may be represented by a histogram, and the histogram may be obtained by performing counting by using at least one of the interfered distance range, the interfered speed range, or the interfered angle range, and a counting quantity is interference intensity. As shown in FIG. 20, a histogram is generated by performing counting by using a distance range. The histogram includes the following information: Interference intensity at a distance of 20 meters to 30 meters is 5 decibels (dB), interference intensity at a distance of 50 meters to 70 meters is 3 dB, and interference intensity at a distance of 150 m to 200 m is 10 dB. Alternatively, the histogram may be obtained by performing counting by using interference intensity, and a counting quantity is a percentage of the impact range of interference. As shown in FIG. 21, for example, interference intensity in 30% of the range is 3 dB, interference intensity in 20% of the range is 5 dB, and interference intensity in 50% of the range is 10 dB.

In this example, the histogram is used, so that the interfered range in the detection result of the detection apparatus can be more accurately described, and target detection accuracy of the fusion apparatus can be increased.

For the foregoing example 3, a specific implementation of S184 is as follows: The fusion apparatus determines the interfered range in the detection range of the detection apparatus based on the histogram.

In the foregoing embodiments provided in this application, the method provided in embodiments of this application is separately described from a perspective of the detection apparatus, the fusion apparatus, and interaction between the detection apparatus and the fusion apparatus. To implement functions in the method provided in the foregoing embodiments of this application, the detection apparatus and the fusion apparatus may include a hardware structure and/or a software module, and the foregoing functions are implemented in a form of a hardware structure, a software module, or a hardware structure and a software module. Whether a specific function in the foregoing functions is performed by using a hardware structure, a software module, or a combination of the hardware structure and the software module depends on a specific application and a design constraint of the technical solutions.

Figure 24:
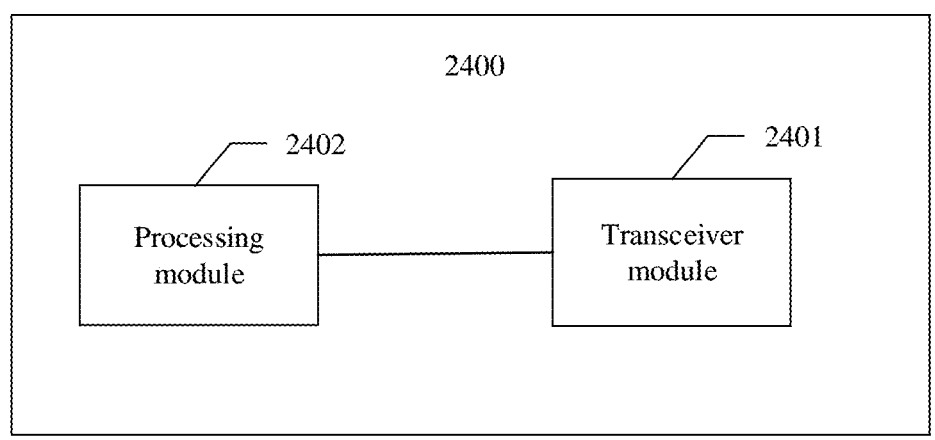
FIG. 24 to FIG. 27 are schematic diagrams of a structure of an apparatus according to embodiments of this application.

Same as the foregoing concept, as shown in FIG. 24, an embodiment of this application provides an apparatus 2400. The apparatus 2400 is configured to implement a function of the detection apparatus in the foregoing embodiment. The apparatus 2400 may be a detection apparatus, or may be a component such as a chip in the detection apparatus, and includes a transceiver module 2401 and a processing module 2402.

The transceiver module 2401 is configured to receive a first signal. The processing module 2402 is configured to determine an interfered range in a detection range of the detection apparatus based on the first signal. The transceiver module 2401 is further configured to send interference information to a fusion apparatus, where the interference information includes indication information of the interfered range.

For specific descriptions of the transceiver module 2401 and the processing module 2402, refer to the descriptions in the foregoing method embodiments. Details are not described herein again.

Figure 25:
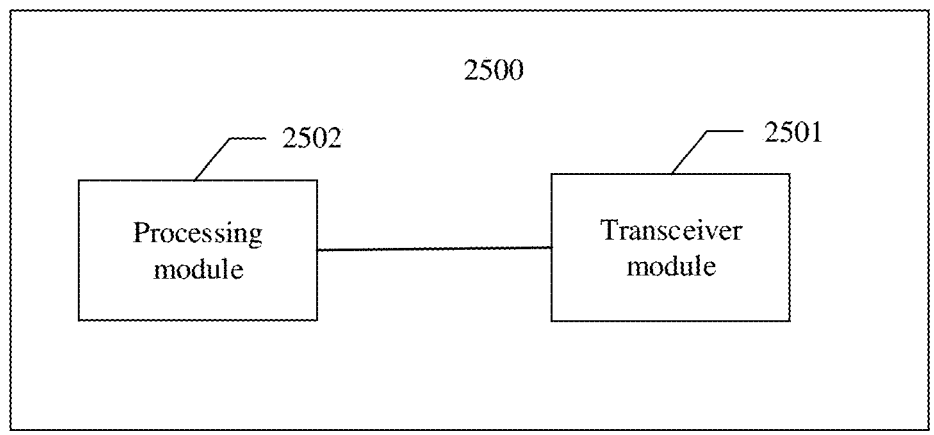

Same as the foregoing concept, as shown in FIG. 25, an embodiment of this application provides an apparatus 2500. The apparatus 2500 is configured to implement a function of the fusion apparatus in the foregoing embodiment. The apparatus 2500 may be a fusion apparatus, or may be a component such as a chip in the fusion apparatus, and includes: a transceiver module 2501, configured to receive interference information from a detection apparatus, where the interference information includes indication information of an interfered range in a detection range of the detection apparatus, and a processing module 2502, configured to determine the interfered range in the detection range of the detection apparatus based on the interference information.

For specific descriptions of the transceiver module 2501 and the processing module 2502, refer to the descriptions in the foregoing method embodiments. Details are not described herein again.

It should be noted that, in embodiments of this application, module division is an example, is merely logical function division, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

Figure 26:
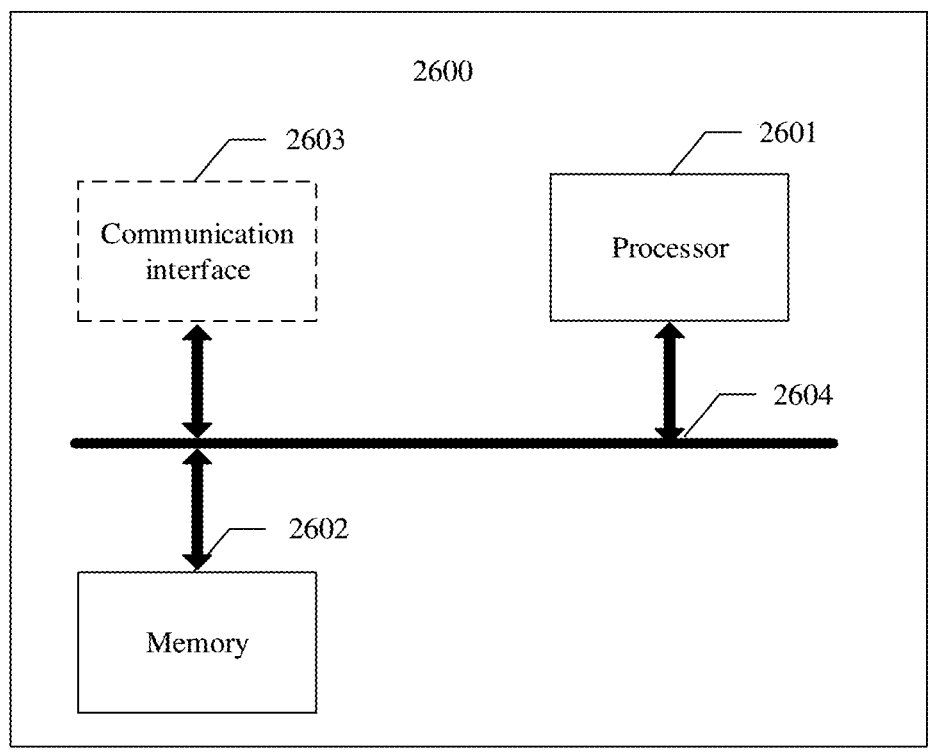

Same as the foregoing concept, as shown in FIG. 26, an apparatus 2600 is provided. The apparatus 2600 may be configured to implement functions of the detection apparatus in the foregoing method. The apparatus 2600 may be a detection apparatus, or the apparatus 2600 may be a chip in the detection apparatus.

The apparatus 2600 includes at least one processor 2601, configured to implement a function of the detection apparatus in the foregoing method. For example, the processor 2601 may determine an interfered range in a detection range of the detection apparatus based on the first signal. For details, refer to the detailed descriptions in the foregoing method. Details are not described herein again.

The apparatus 2600 may further include at least one memory 2602, configured to store a program and/or data. The memory 2602 is coupled to the processor 2601. The coupling in this embodiment of this application may be an indirect coupling or a communications connection between apparatuses, units, or modules. The coupling may be implemented in electronic, mechanical, or other forms, and is used for information exchange between the apparatuses, the units, or the modules. The processor 2601 cooperates with the memory 2602. The processor 2601 may execute program instructions stored in the memory 2602, and at least one of the at least one memory may be included in the processor 2601.

The apparatus 2600 may further include a communications interface 2603, configured to communicate with another device by using a communication transmission medium, so that an apparatus used in the apparatus 2600 may communicate with the another device. The another device may be a fusion apparatus. For example, the communications interface 2603 may be a transceiver, a circuit, a bus, a module, or another type of communications interface. The processor 2601 may send and receive data through the communications interface 2603, to implement the method in the foregoing embodiment. For example, the processor 2601 may receive a first signal and send interference information to the fusion apparatus through the communications interface 2603.

A connection medium between the communications interface 2603, the processor 2601, and the memory 2602 is not limited in this embodiment of this application. In this embodiment of this application, the memory 2602, the processor 2601, and the communications interface 2603 are connected through a bus 2604 in FIG. 26, and the bus is represented by a thick line in FIG. 26. A manner of connecting other components is merely an example for description, and is not limited thereto. The bus may be classified into an address bus, a data bus, a control bus, and the like. For ease of representation, only one thick line is used for representation in FIG. 26, but this does not mean that there is only one bus or only one type of bus.

Figure 27:
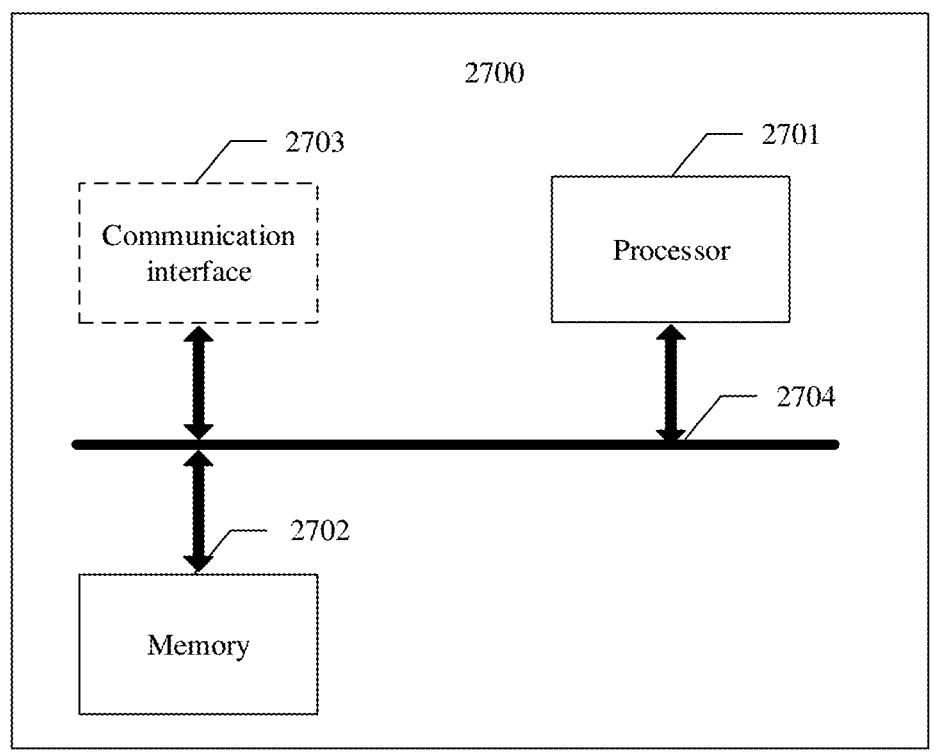

Same as the foregoing concept, as shown in FIG. 27, an apparatus 2700 is provided. The apparatus 2700 may be configured to implement functions of the fusion apparatus in the foregoing method. The apparatus 2700 may be a fusion apparatus, or the apparatus 2700 may be a chip in the fusion apparatus.

The apparatus 2700 includes at least one processor 2701, configured to implement a function of the fusion apparatus in the foregoing method. For example, the processor 2701 may determine an interfered range in a detection range of a detection apparatus based on interference information. For details, refer to the descriptions in the foregoing method. Details are not described herein again.

The apparatus 2700 may further include at least one memory 2702, configured to store a program and/or data. The memory 2702 is coupled to the processor 2701. The coupling in this embodiment of this application may be an indirect coupling or a communications connection between apparatuses, units, or modules. The coupling may be implemented in electronic, mechanical, and other forms, and is used for information exchange between the apparatuses, the units, or the modules. The processor 2701 cooperates with the memory 2702. The processor 2701 may execute program instructions stored in the memory 2702, and at least one of the at least one memory may be included in the processor 2701.

The apparatus 2700 may further include a communications interface 2703, configured to communicate with another device by using a communication transmission medium, so that an apparatus used in the apparatus 2700 may communicate with the another device. The another device may be a detection apparatus. For example, the communications interface 2703 may be a transceiver, a circuit, a bus, a module, or another type of communications interface. The processor 2701 may send and receive data through the communications interface 2703, to implement the method in the foregoing embodiment. For example, the processor 2701 may receive the interference information through the communications interface 2703.

A connection medium between the communications interface 2703, the processor 2701, and the memory 2702 is not limited in this embodiment of this application. Optionally, in this embodiment of this application, in FIG. 27, the memory 2702, the processor 2701, and the communications interface 2703 are connected by using a bus 2704. The bus is represented by a thick line in FIG. 27. A connection manner between other components is merely an example for description, and is not limited thereto. The bus may be classified into an address bus, a data bus, a control bus, and the like. For ease of representation, only one thick line is used for representation in FIG. 27, but this does not mean that there is only one bus or only one type of bus.

In embodiments of this application, the processor may be a general-purpose processor, a digital signal processor, an application-specific integrated circuit, a field-programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In embodiments of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

Same as the foregoing concept, an embodiment of this application further provides a system, and the system includes at least one detection apparatus and a fusion apparatus. For the detection apparatus and the fusion apparatus, refer to the descriptions in the foregoing method embodiments. Details are not described herein again. Optionally, the system may further include a controller. The fusion apparatus and the controller may exist alone physically, or the fusion apparatus and the controller may be integrated into a module. The integrated module may be implemented in a form of hardware, or may be implemented in a form of a software function, or the fusion apparatus may be integrated inside the controller. The system may be applied to different scenarios. For example, the system may be applied to a scenario such as unmanned driving, automatic driving, intelligent driving, and networked driving. This is not limited. Optionally, the controller may be a vehicle-mounted central controller.

Same as the foregoing concept, this application further provides a terminal apparatus. The terminal apparatus may be specifically a motor vehicle, an unmanned aerial vehicle, or the like, and the terminal apparatus includes at least one detection apparatus and a fusion apparatus. For the detection apparatus and the fusion apparatus, refer to the descriptions in the foregoing method embodiments. Details are not described herein again. Optionally, the terminal apparatus may further include a controller, and the controller is configured to control and manage the terminal apparatus. When the terminal apparatus is a motor vehicle, the controller may be referred to as a vehicle central controller or the like. The controller and the fusion apparatus may exist alone physically, or the fusion apparatus and the controller may be integrated into a module, or the fusion apparatus may be integrated inside the controller or the like. This is not limited.

All or some of the methods provided in embodiments of this application may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, procedures or functions according to embodiments of the present invention are all or partially generated. The computer may be a general-purpose computer, a special-purpose computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, SSD), or the like.

It is clear that a person skilled in the art can make various modifications and variations to this application without departing from the scope of this application. This application is intended to cover these modifications and variations of this application provided that they fall within the scope of the claims of this application and their equivalent technologies.

In embodiments of this application, on a premise that there is no logical contradiction, embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

What is claimed is:

1. An information reporting method performed by a radar system comprising a millimeter-wave radar and an electronic control unit (ECU), the method comprising:
   receiving, by an antenna in the millimeter-wave radar, a first signal;
   performing, by a frequency mixer in the millimeter-wave radar, frequency mixing on the first signal and a local-frequency signal to obtain a second signal;
   determining, by the millimeter-wave radar, based on the second signal, an interfered range in a detection range of the millimeter-wave radar, wherein the interfered range comprises an impact range of interference comprising one or more ranges of detectable values defining where, in the detection range, that interference exists; and
   sending, by the millimeter-wave radar, interference information to the ECU, wherein the interference information comprises indication information of the interfered range, wherein the sending the interference information to the ECU causes the ECU to determine, according to the interference information, a confidence level for the first signal for object detection associated with an automated vehicle control process.

2. The method according to claim 1, wherein the indication information of the interfered range indicates at least one of an interfered distance range, an interfered speed range, or an interfered angle range.

3. The method according to claim 2, wherein the interfered range is determined according to at least one of an interfered distance interval, an interfered speed interval, or an interfered angle interval, wherein the interfered distance range is represented by the distance interval, wherein the interfered speed range is represented by the speed interval, and wherein the interfered angle range is represented by the angle interval.

4. The method according to claim 2, wherein the interference information comprises at least one piece of interference intensity information, and wherein the at least one piece of interference intensity information corresponds to at least one of the interfered distance range, the interfered speed range, or the interfered angle range.

5. The method according to claim 2, wherein the interfered range is determined according to a matrix represented by at least one of an interfered distance dimension, an interfered speed dimension, or an interfered angle dimension, and wherein an element value of the matrix represents interference intensity information; and
wherein at least one of the interfered distance range, the interfered speed range, or the interfered angle range is determined according to at least one of a distance dimension, a speed dimension, or an angle dimension in which an element that is in the matrix and whose element value belongs to a first range is located.

6. The method according to claim 5, wherein the first range a first comprises value and a second value; and
wherein the first value is greater than the second value, and wherein an interference intensity represented by the first value is greater than an interference intensity represented by the second value.

7. The method according to claim 1, wherein the interference information further comprises at least one of indication information indicating whether the millimeter-wave radar receives an interference signal or a time range in which the millimeter-wave radar is interfered with.

8. An information receiving method performed by an electronic control unit (ECU) in a radar system, comprising:
receiving, by the ECU, from a millimeter-wave radar comprised in the radar system, interference information associated with a first signal, wherein the interference information comprises indication information of an interfered range in a detection range of the millimeter-wave radar, wherein the interfered range comprises an impact range of interference comprising one or more ranges of detectable values defining where, in the detection range, that interference exists, wherein the interfered range is determined based on a second signal, wherein the second signal is obtained by performing frequency mixing on the first signal and a local-frequency signal of the millimeter-wave radar using a frequency mixer in the millimeter-wave radar, and wherein the first signal is received by an antenna in the millimeter-wave radar;
determining, by the ECU, the interfered range in the detection range of the millimeter-wave radar based on the interference information; and
determining, according to the interference information, a confidence level for the first signal for object detection associated with an automated vehicle control process.

9. The method according to claim 8, wherein the indication information of the interfered range indicates at least one of an interfered distance range, an interfered speed range, or an interfered angle range.

10. The method according to claim 9, wherein the determining the interfered range in the detection range of the millimeter-wave radar comprises:
determining, by the ECU, the interfered range in the detection range of the millimeter-wave radar based on at least one of an interfered distance interval, an interfered speed interval, or an interfered angle interval, wherein the interfered distance range is represented by the distance interval, wherein the interfered speed range is represented by the speed interval, and wherein the interfered angle range is represented by the angle interval.

11. The method according to claim 9, wherein the interference information comprises at least one piece of interference intensity information, and wherein the at least one piece of interference intensity information corresponds to at least one of the distance range, the speed range, or the angle range.

12. The method according to claim 9, wherein the determining the interfered range in the detection range of the millimeter-wave radar comprises:
determining, by the ECU, the interfered range in the detection range of the millimeter-wave radar based on a matrix represented by at least one of an interfered distance dimension, an interfered speed dimension, or an interfered angle dimension;
wherein an element value of the matrix represents interference intensity information, and wherein at least one of the interfered distance range, the interfered speed range, or the interfered angle range is determined according to at least one of a distance dimension, a speed dimension, or an angle dimension in which an element that is in the matrix and whose element value belongs to a first range is located.

13. The method according to claim 12, wherein the first range comprises a first value and a second value; and
wherein the first value is greater than the second value, and wherein an interference intensity represented by the first value is greater than an interference intensity represented by the second value.

14. The method according to claim 8, wherein the interference information further comprises at least one of indication information indicating whether the millimeter-wave radar receives an interference signal or a time range in which the millimeter-wave radar is interfered with.

15. An apparatus, comprising:
a millimeter-wave radar comprising:
an antenna configured to receive a first signal; and
a frequency mixer configured to perform frequency mixing on the first signal and a local-frequency signal to obtain a second signal;
an electronic control unit (ECU);
a processor; and
a non-transitory memory comprising a computer program for execution by the processor, the computer program including instructions for:
determining an interfered range in a detection range of the millimeter-wave radar based on the second signal, wherein the interfered range comprises an impact range of interference comprising one or more ranges of detectable values defining where, in the detection range, that interference exists; and
sending interference information to the ECU, wherein the interference information comprises indication information of the interfered range, wherein the sending the interference information to the ECU causes the ECU to determine, according to the interference information, a confidence level for the first signal for object detection associated with an automated vehicle control process.

16. The apparatus according to claim 15, wherein the indication information of the interfered range indicates at least one of an interfered distance range, an interfered speed range, or an interfered angle range.

17. The apparatus according to claim 16, wherein the interfered range is determined by at least one of an interfered distance interval, an interfered speed interval, or an interfered angle interval, and wherein the interfered distance range is represented by the distance interval, the interfered speed range is represented by the speed interval, or the interfered angle range is represented by the angle interval.

18. The apparatus according to claim 17, wherein the interference information comprises at least one piece of interference intensity information, and wherein the at least one piece of interference intensity information corresponds to at least one of the interfered distance range, the interfered speed range, or the interfered angle range.

19. The apparatus according to claim 16, wherein the interfered range is determined according to a matrix represented by at least one of an interfered distance dimension, an interfered speed dimension, or an interfered angle dimension, and wherein an element value of the matrix represents interference intensity information; and wherein at least one of the interfered distance range, the interfered speed range, or the interfered angle range is determined according to at least one of a distance dimension, a speed dimension, or an angle dimension in which an element that is in the matrix and whose element value belongs to a first range is located.

20. The apparatus according to claim 19, wherein the first range comprises a first value and a second value; and wherein the first value is greater than the second value, and wherein an interference intensity represented by the first value is greater than an interference intensity represented by the second value.

* * * * *